US006383416B1

(12) United States Patent
Hamada et al.

(10) Patent No.: US 6,383,416 B1

(45) Date of Patent: May 7, 2002

(54) ELECTRON-EMITTING MATERIAL AND PREPARING PROCESS

(75) Inventors: Munemitsu Hamada; Akira Takeishi; Makoto Takahashi; Dai Matsuoka; Masatada Yodogawa; Hiraku Harada, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/517,571

(22) Filed: Mar. 2, 2000

(30) Foreign Application Priority Data

| | | |
|---|---|---|
| Mar. 12, 1999 | (JP) | 11-067614 |
| Mar. 12, 1999 | (JP) | 11-067615 |
| Mar. 19, 1999 | (JP) | 11-076941 |
| Dec. 6, 1999 | (JP) | 11-346962 |
| Dec. 6, 1999 | (JP) | 11-346964 |
| Dec. 6, 1999 | (JP) | 11-346966 |

(51) Int. Cl.$^7$ .......... H01B 1/06; B05D 5/12; C01B 21/20

(52) U.S. Cl. .......... 252/521.5; 232/521.1; 232/518.1; 427/77; 427/78; 423/385

(58) Field of Search .......... 252/518.1, 519.1, 252/521.1, 521.5; 427/58, 77, 78; 423/385

(56) References Cited

U.S. PATENT DOCUMENTS

| | | | | |
|---|---|---|---|---|
| 2,686,274 A | | 8/1954 | Rooksby | |
| 2,888,592 A | | 5/1959 | Lafferty | |
| 3,798,492 A | | 3/1974 | Menelly | |
| 3,906,271 A | | 9/1975 | Aptt, Jr. | |
| 4,734,390 A | * | 3/1988 | Marchand et al. | 501/96 |
| 4,808,883 A | | 2/1989 | Iwaya et al. | |
| 4,964,016 A | | 10/1990 | Marchand et al. | |

FOREIGN PATENT DOCUMENTS

| | | |
|---|---|---|
| JP | 59-75553 | 4/1984 |
| JP | 63-252920 | 10/1988 |
| JP | 4-43546 | 2/1992 |
| JP | 6-267404 | 9/1994 |
| JP | 6-302298 | 10/1994 |
| JP | 6-103627 | 12/1994 |
| JP | 7-142031 | 6/1995 |
| JP | 7-262963 | 10/1995 |
| JP | 2628312 | 4/1997 |
| JP | 9-120794 | 5/1997 |
| JP | 9-129177 | 5/1997 |
| JP | 10-3879 | 1/1998 |
| JP | 10-12189 | 1/1998 |
| JP | 2754647 | 3/1998 |
| JP | 2773174 | 4/1998 |

OTHER PUBLICATIONS

A. Hellwig, et al., Journal of Materials Science, vol. 29, pp. 4686–4693, "Formation of Barium–Tantalum Oxynitrides", 1994.

* cited by examiner

*Primary Examiner*—Mark Kopec

(74) *Attorney, Agent, or Firm*—Oblon, Spivak, McClelland, Maier & Neustadt, P.C.

(57) ABSTRACT

An electron-emitting material contains a first metal component selected from Ba, Sr and Ca and a second metal component selected from Ta, Zr, Nb, Ti and Hf and also contains oxynitride perovskite. The electron-emitting material has improved electron emission characteristics, restrained evaporation at elevated temperatures, and minimized consumption by ion sputtering. The electron-emitting material is prepared by firing a metal component-containing raw material disposed in proximity to carbon in a nitrogen gas-containing atmosphere to thereby create oxynitride perovskite.

22 Claims, 12 Drawing Sheets

POWDER AND SINTERED BODY PRODUCING PROCESS 1

POWDER AND SINTERED BODY PRODUCING PROCESS 1

SINTERED BODY PRODUCING PROCESS 2

POWDER AND SINTERED BODY PRODUCING PROCESS 3

ELECTRON-EMITTING MATERIAL AND PREPARING PROCESS

This invention relates to electron-emitting materials for use in electrodes in discharge lamps, cathode ray tubes, plasma displays and fluorescent display tubes, and a process for preparing the same.

BACKGROUND OF THE INVENTION

Nowadays the social concern about energy saving and resource saving is increasing. With respect to light sources for general illumination and displays, active efforts have been made for saving the energy used to operate them. For example, the replacement of incandescent lamps by compact self-ballasted fluorescent lamps featuring a high energy efficiency and a longer life is accelerated as well as the replacement of cathode ray tubes by liquid crystal displays featuring a lower energy consumption. Accordingly, the demand for fluorescent lamps is increasing since they are used not only as compact self-ballasted fluorescent lamps, but also as back light sources for liquid crystal displays. For the same reason, energy-saving electrodes having a high energy efficiency are demanded for cathode ray tubes, plasma display panels, and fluorescent display tubes.

In prior art fluorescent lamps, oxide electrodes based on BaO are generally used. Such electrodes are described, for example, in JP-A 59-75553. The BaO base oxide electrodes have a good electron emission function, but a high resistivity. If a greater current flow is conducted for increasing electron emission, the electrode is heated to a high temperature, which leads to a higher vapor pressure and allows more evaporation, resulting in a shorter life. Also, the preparation of BaO base oxide electrodes requires decarboxylation because they are prepared by conducting electric current across a tungsten coil coated with barium carbonate for converting the carbonate salt to an oxide. This process, however, tends to achieve decarboxylation to an insufficient extent. When the resulting electrode is used in a fluorescent lamp having a slender bulb, carbon dioxide gas is left in the lamp bulb, giving rise to such problems as discharge instability and extremely reduced luminance retention.

U.S. Pat. No. 2,686,274 discloses a rod-shaped electrode obtained by reducing a ceramic material such as $Ba_2TiO_4$ into a semiconductor. Ceramic semiconductor electrodes of this type, however, suffer from the problems of low thermal impact resistance, easy deterioration by sputtering with mercury or rare gas ions, and a low current density available.

With these prior art fluorescent lamp electrodes borne in mind, the inventors proposed an electrode of the structure having a ceramic semiconductor received in a cylindrical container with one end open and the other end closed and made a number of improvements in this electrode and a discharge lamp using the electrode. See JP-B 6-103627, Japanese Patent Nos. 2,628,312, 2,773,174, and 2,754,647, JP-A 4-43546, JP-A 6-267404, JP-A 9-129177, JP-A 10-12189, JP-A 6-302298, JP-A 7-142031, JP-A 7-262963, and JP-A 10-3879. These electrodes have the advantages of improved sputtering resistance, retarded evaporation, retarded deterioration, and a long lifetime. With respect to sputtering resistance and evaporation, however, further improvements are desired.

Besides the electrodes for fluorescent lamps and other discharge lamps, evaporation and deterioration by ion sputtering are outstanding problems for various electrodes utilizing an electric discharge by way of hot or cold cathode action, for use in, for example, cathode ray tubes, electron microscopes, plasma displays, and field emission displays. It is desired to extend the lifetime of these electrodes.

SUMMARY OF THE INVENTION

An object of the invention is to provide a novel and improved electron-emitting material having restrained evaporation during electric discharge and a high resistance to ion sputtering. Another object of the invention is to provide a process capable of mass-scale production of such an electron-emitting material at low cost.

In a first aspect of the invention, there is provided an electron-emitting material containing a first component selected from the group consisting of barium, strontium, calcium and mixtures thereof, and a second component selected from the group consisting of tantalum, zirconium, niobium, titanium, hafnium and mixtures thereof, as metal element components and also containing oxynitride perovskite.

Preferably, the electron-emitting material contains $M^{I}M^{II}O_2N$ type crystals as the oxynitride perovskite wherein $M^{I}$ denotes the first component and $M^{II}$ denotes the second component. The electron-emitting material preferably satisfies the relationship:

$$0.8 \leqq X/Y \leqq 1.5$$

wherein X and Y are molar ratios of the first and second components to the total of the first and second components, respectively. The second component may be partially present in the form of a carbide or nitride or both. The electron-emitting material may further contain as an additional metal element component at least one element M which is selected from the group consisting of Mg, Sc, Y, La, V, Cr, Mo, W, Fe, Ni, and Al, preferably in an amount of more than 0 mass % to 10 mass % calculated as oxide. Typically the electron-emitting material further contains at least one oxide selected from among $M^{I}_4M^{II}_2O_9$, $M^{I}M^{II}_2O_6$, $M^{I}M^{II}O_3$, $M^{I}_5M^{II}_4O_{15}$, $M^{I}_7M^{II}_6O_{22}$, and $M^{I}_6M^{II}M^{II}_4O_{18}$ type crystals wherein $M^{I}$ and $M^{II}$ are as defined above. The electron-emitting emitting material preferably has a resistivity of $10^{-6}$ to $10^{3}$ Ωm at room temperature.

In a second aspect, the invention provides a process for preparing an electron-emitting material as defined above, comprising the oxynitride forming step of firing a metal element component-containing material disposed in proximity to carbon in a nitrogen gas-containing atmosphere to create oxynitride perovskite, yielding the electron-emitting material.

The nitrogen gas-containing atmosphere preferably has an oxygen partial pressure of 0 to $5.0 \times 10^{3}$ Pa. Preferably, a nitrogen gas stream is used as the nitrogen gas-containing atmosphere and fed at a flow rate of 0.0001 to 5 m/s per unit area in a cross section perpendicular to the direction of nitrogen stream in a space proximate to the material to be fired. In one preferred embodiment, carbon is admixed with the metal element component-containing material so that the metal element component-containing material is disposed in proximity to carbon; or a firing furnace which is at least partially composed of carbon is used in the oxynitride forming step so that the metal element component-containing material is disposed in proximity to carbon; or the metal element component-containing material is received in a container which is at least partially composed of carbon so that the metal element component-containing material is disposed in proximity to carbon. Preferably, the metal element component-containing material contains a compound oxide. In one preferred embodiment, the metal element component-containing material is molded into a compact, which is fired in the oxynitride forming step to provide a sintered body of electron-emitting material; or the metal element component-containing material is applied to form a coat, which is fired in the oxynitride forming step to provide a film of electron-emitting material.

The process may further involve the step of pulverizing the electron-emitting material resulting from the oxynitride forming step, yielding a powder of electron-emitting material. In one preferred embodiment, the process further involves the steps of molding the electron-emitting material powder into a compact, and firing the compact in a nitrogen gas-containing atmosphere to form a sintered body of electron-emitting material while restraining decomposition of the oxynitride perovskite. In another preferred embodiment, the process further involves the steps of preparing a slurry of the electron-emitting material powder, applying the slurry to form a coat, and heat treating the coat to form a film of the electron-emitting material.

DESCRIPTION OF THE PREFERRED EMBODIMENTS

Figure 1:
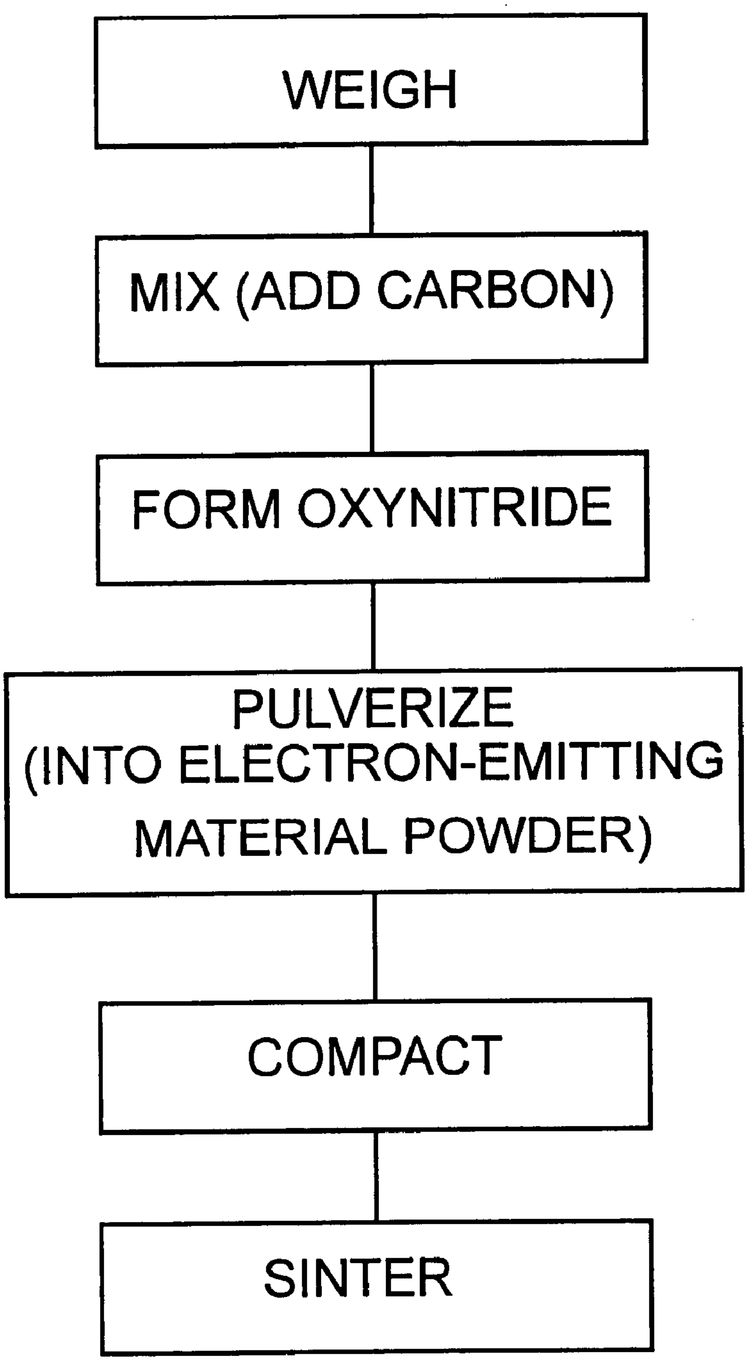
FIG. 1 is a flow diagram showing a process for producing an electron-emitting material in powder or sintered body form according to the invention.

The electron-emitting material of the invention contains the oxynitride which has a low vapor pressure and at the same time, a low resistivity. As compared with the prior art electron-emitting materials based on BaO, the electron-emitting material of the invention allows a higher electron-emitting current to be conducted thereacross. Since the electron-emitting material of the invention is less vulnerable to evaporation, an electrode made thereof experiences less deterioration by evaporation. As compared with the electrode of Ba—Zr—Ta compound oxide described in JP-A 9-129177 by the same assignee as the present invention, the electrode using the electron-emitting material of the invention experiences less deterioration. Accordingly, when the electrode using the electron-emitting material of the invention is used as an electrode capable of hot cathode or thermionic action, it produces a higher luminance than the prior art electrodes and has an extremely extended lifetime.

The oxynitride is less consumed by ion sputtering. Therefore, even when subjected to the cold cathode action entailing severe ion sputtering on account of an increased cathode voltage drop, the electrode experiences less consumption and thus has a long lifetime.

The oxynitride having a perovskite structure is described in Journal of Materials Science, 29, 1994, pp. 4686–4693. The oxynitride is prepared by firing at 1,000° C. in an ammonia gas stream. This article considers the oxynitride merely as a dielectric material. Since the oxynitride is stable even in a reducing atmosphere, it is suitable for use in multilayer ceramic capacitors having internal electrodes of base metal.

Also, Marchand et al, U.S. Pat. No. 4,964,016 or JP-A 63-252920 discloses conductive perovskites represented by the formula $AB(O,N)_3$. In this formula, A denotes a metal chosen from the metals of groups IA and IIA, yttrium and the lanthanides, and B denotes a metal chosen from the transition metals of groups IVA to IB. According to this patent, conductive perovskites are prepared by firing mixed oxides of metals A and B at a temperature of about 700 to 900° C. in an ammonia gas stream. It is proposed therein to use the conductive perovskites as electrodes in ceramic capacitors. It is nowhere disclosed or indicated to apply the conductive perovskites to electron-emitting materials. The composition of the conductive perovskite described in Marchand overlaps the composition of the oxynitride in the electron-emitting material of the present invention. However, Marchand does not disclose any specific oxynitride perovskite having a composition falling within the scope of the present invention. If a material having a composition falling within the scope of the present invention is fired in an ammonia gas stream under the conditions described in Marchand, the resulting material has a too high resistivity, failing to achieve desirable properties as electron-emitting material.

In summary, although oxynitrides having the perovskite structure are per se known, it is our own discovery to use the oxynitride as electron-emitting material. It is utterly unknown in the art that the above-described advantages are obtained when the oxynitride is used as an electrode. So far, the oxynitride that is contained in the electron-emitting material according to the present invention is unknown as an electron-emitting material.

Now, the electron-emitting material of the invention is described in further detail.

Electron-emitting Material

The electron-emitting material contains a first component selected from the group consisting of barium Ba, strontium Sr, calcium Ca and mixtures thereof, and a second component selected from the group consisting of tantalum Ta, zirconium Zr, niobium Nb, titanium Ti, hafnium Hf and mixtures thereof, as metal element components. The first component is an electron-emitting component having a low work function. The second component is necessary to reduce the resistivity and increase the melting point of the electron-emitting material. As the first component, barium is preferable. Preferably barium accounts for 50 to 100 at %, and more preferably 70 to 100 at % of the first component. As the second component, tantalum and/or zirconium and especially tantalum is preferable. Preferably tantalum accounts for 50 to 100 at %, and more preferably 70 to 100 at % of the second component.

When the content of tantalum is limited to 98 at % or less, and especially 95 at % or less of the second component, the evaporation temperature of the first component (especially Ba) becomes higher, contributing to a further extension of the discharge lamp life.

The electron-emitting material of the invention contains oxynitride having the perovskite structure, that is, an oxynitride perovskite. Preferably the oxynitride contains at least $M^IM^{II}O_2N$ type crystals wherein $M^I$ denotes the first component and $M^{II}$ denotes the second component. In the crystals, the ratio of oxygen to nitrogen is not limited to 2:1. Because of the presence of oxygen and nitrogen defects, the actual oxynitride is represented by $M^IM^{II}O_{2+\delta}N_{1-\delta}$, wherein δ and δ' are numbers in the range of −0.5 to 0.95, preferably 0 to 0.7. As long as δ and δ' fall within this range, the electron-emitting material is effectively restrained from evaporation and consumption by sputtering. It is noted that the $M^IM^{II}O_2N$ type crystal can also be represented as $M^IM^{II}(O,N)_3$ type crystal.

In addition to the oxynitride perovskite, the electron-emitting material of the invention may further contain an oxide. The oxide is at least one of compound oxides including $M^I_4M^{II}_2O_9$ type crystals,
$M^IM^{II}_2O_6$ type crystals,
$M^IM^{II}O_3$ type crystals,
$M^I_5M^{II}_4O_{15}$ type crystals,
$M^I_7M^{II}_6O_{22}$ type crystals, and
$M^I_6M^{II}M^{II}_4O_{18}$ type crystals.

It is noted that $Ba_6ZrTa_4O_{18}$ is exemplary of the $M^I_6M^{II}M^{II}_4O_{18}$ type crystal.

In addition to the oxynitride, the electron-emitting material of the invention may further contain a carbide and/or nitride, especially a $M^{II}$ carbide such as TaC. The carbide and nitride are introduced as a result of the second component being partially converted into a carbide or nitride during the electron-emitting material preparation process. Since the carbide and nitride have a high melting point and high conductivity, the inclusion of these substances does not detract from electron-emitting characteristics and sputtering resistance. It is understood that of the second component elements, tantalum is likely to form a carbide and zirconium is likely to form a nitride.

Figure 8:
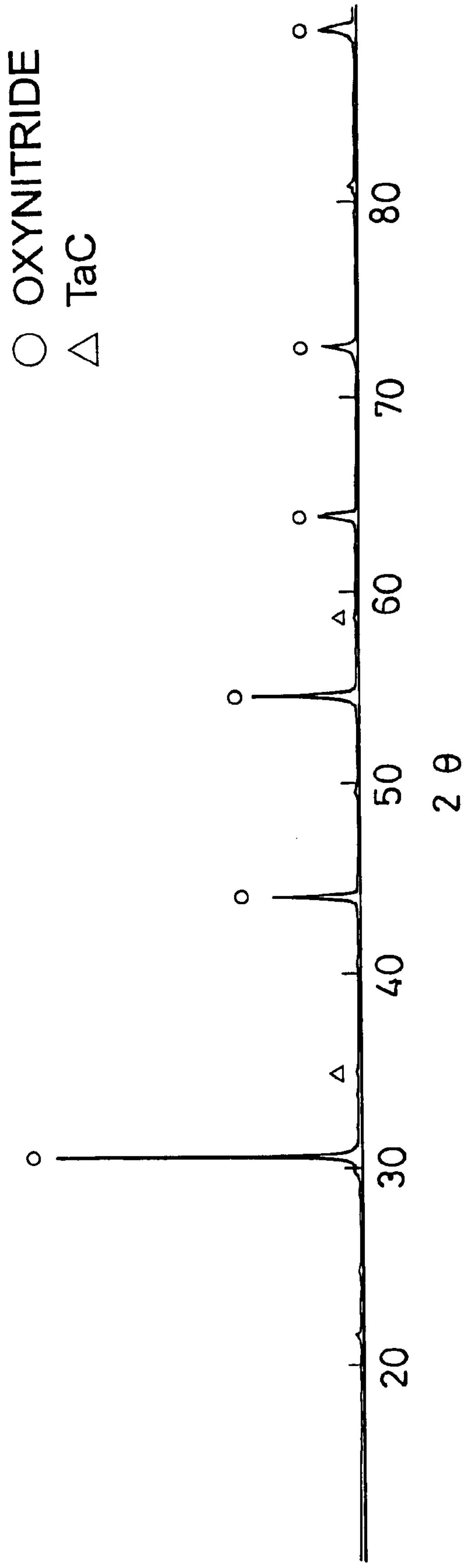
FIG. 8 is an x-ray diffraction pattern of an electron-emitting material according to the invention (sample No. 104 in Example 1).

The presence of crystals in the electron-emitting material can be confirmed by x-ray diffractometry. FIG. 8 shows an x-ray diffraction pattern of a typical electron-emitting material. The pattern shown in FIG. 8 is of an electron-emitting material consisting essentially of a single phase of $M^IM^{II}O_2N$ type crystals, with TaC removed. The electron-emitting material of the invention preferably contains $M^IM^{II}O_2N$ type crystals as the main component and more preferably consists essentially of the $M^IM^{II}O_2N$ type crystals. However, the inclusion of a carbide and/or a nitride is acceptable as previously described. The containment of $M^IM^{II}O_2N$ type crystals as the main component means that when the maximum peak intensities of different crystals are compared in an x-ray diffraction pattern, the maximum peak intensity of crystals other than the $M^IM^{II}O_2N$ type is less than 50%, preferably less than 30% of the maximum peak intensity of $M^IM^{II}O_2N$ type crystal. It is noted that when there are simultaneously formed two or more oxides whose maximum peak positions are substantially coincident as in the case of $BaZrO_3$ and $Ba_5Ta_4O_{15}$, the second highest peak intensity is used for the comparison with the maximum peak intensity of $M^IM^{II}O_2N$ type crystal.

Preferably the electron-emitting material satisfies the relationship:

$0.8 \leqq X/Y \leqq 1.5$, and more preferably $0.9 \leqq X/Y \leqq 1.2$, wherein X and Y are molar ratios of the first and second components to the total of the first and second components, respectively. If X/Y is too low, the first component can be prematurely depleted due to an electric discharge and the electron-emitting material may become less resistant to sputtering. If X/Y is too high, the electron-emitting material becomes likely to evaporate during electric discharge and scatter by sputtering. In either case, the electron-emitting material applied to a discharge lamp can cause blackening of the tube wall, leading to a lowering of luminance.

The electron-emitting material may further contain an additional metal element component other than the first and second components. Such an additional metal element component is at least one element M which is selected from the group consisting of Mg, Sc, Y, La, V, Cr, Mo, W, Fe, Ni, and Al. The element M is optionally added in order to improve sinterability. The content of element M in the electron-emitting material is preferably up to 10 mass %, more preferably up to 5 mass % calculated as an oxide. An electron-emitting material with a too high content of element M may have a low melting point and hence, a higher vapor pressure during high-temperature use, resulting in a shorter lifetime. In order to derive a sufficient effect from the addition of the element M, the content of element M should preferably be at least 0.5 mass %. By the content calculated as an oxide is meant the content of an element calculated as its oxide of a stoichiometric composition, specifically MgO, $Sc_2O_3$, $Y_2O_3$, $La_2O_3$, $V_2O_5$, $Cr_2O_3$, $MoO_3$, $WO_3$, $Fe_2O_3$, NiO and $Al_2O_3$.

The element M is present as a partial replacement for $M^I$ or $M^{II}$ in the oxynitride or as an oxide, nitride or carbide in admixture with the oxynitride rather than the replacement. It is noted that the partial replacement of the other metal element for $M^I$ or $M^{II}$ in the oxynitride crystals is ascertainable by a shift of a peak or a change of a peak intensity ratio in x-ray diffractometry.

The electron-emitting material of the invention usually has a resistivity of $10^{-6}$ to $10^3$ Ωm at room temperature and is not dielectric. The electron-emitting material exhibits excellent electron emission properties at the operating temperature (typically about 900 to 1,400° C. for hot cathodes and about 700 to 1,000° C. for cold cathodes). Namely, even when the electron-emitting material is heated to a high temperature by conducting a large quantity of discharge current, its consumption is minimized because of its low vapor pressure.

Preparation of Electron-emitting Material

The electron-emitting material of the invention can be prepared using a well-known process for the preparation of oxynitride. More specifically, as described in the above-referred Journal of Materials Science, 29, 1994, pp. 4686–4693, the oxynitride can be prepared by mixing starting compounds such as oxides and carbonates and firing the mixture in an ammonia gas stream. Understandably, since the material which is fired under the conditions described in the above-referred article has a too high resistivity as previously mentioned, the firing temperature in the case of firing in an ammonia gas stream should preferably be at least 1,100° C., and more preferably at least 1,200° C. In order to prevent the material from being melted during firing, the firing temperature should preferably be up to 2,000° C., and more preferably up to 1,700° C.

In the case of firing in an ammonia gas stream, however, an attention must be paid to the corrosion resistance of a preparation device because the exhaust gases contain highly alkaline ammonia. A trap utilizing sulfuric acid must be disposed at the exhaust port of the device so that ammonia may not be released to the atmosphere. For these reasons, the process is not amenable to mass production and requires a higher installation cost.

Then seeking for a process capable of producing oxynitride perovskite without using an ammonia gas stream, we have found that oxynitride perovskite can be produced by firing a powder mixture of raw materials disposed in close proximity to carbon in a nitrogen gas-containing atmosphere. This process utilizes nitrogen gas which is stable and easy to handle, eliminating the problem of the ammonia stream-utilizing process. This process is novel as a process for preparing oxynitride perovskite and is first proposed by us. The material to be fired in the process may be the source powder itself or a coated film containing the source powder or a molded part containing the source powder. The source powder is an oxide and/or a starting material which will form an oxide upon firing or an intermediate product obtained by firing the starting material to form a compound oxide.

In the practice of the process, the means for disposing a material to be fired in close proximity to carbon is not critical. For example, a firing furnace at least a part of which is made of carbon is used, or a material is fired in a furnace with carbon in bulk, particulate or powder form loaded therein, or a material in admixture with carbon in particulate or powder form is fired, or a material is placed in a container at least a part of which is made of carbon before it is fired. A combination of two or more of these means is also acceptable. Of these means, the means of firing a material in admixture with carbon in particulate or powder form is preferred since it is easy to bring the source powder in the material in substantially uniform contact with carbon and to expose the material to a nitrogen gas stream. However, when a relatively thin coating film is to be fired, carbon powder need not be dispersed in the coating film. This is because if the coating film is thin, carbon can be sufficiently supplied to the source powder in the coating film from the firing furnace or container and because if carbon powder is dispersed in a thin coating film, the carbon powder can affect the density and flatness of the coating film.

Exemplary of the firing furnace composed at least partially of carbon are a furnace lined with a thermal insulator composed at least partially of carbon and an electric furnace in which only a heater or a heater and a thermal insulator are composed of carbon. Exemplary of the container composed at least partially of carbon is a container having at least one end open so as not to prevent nitrogen gas from contacting the material.

Instead of carbon element, carbon compounds may also be utilized. For example, molded parts or coated films usually contain a binder in the form of an organic compound. If firing is effected so as to achieve insufficient removal of the binder, carbon can be supplied from the binder to help the formation of oxynitride. The formation of oxynitride can also be assisted by introducing an organic compound into the source powder or introducing an organic compound into the furnace prior to firing. Nevertheless the utilization of carbon element is more preferable since the oxynitride can be produced in a stable manner and the risk that the residual organic compound causes to detract from the characteristics of the electron-emitting material is eliminated.

Now, the processes for producing the electron-emitting material of the invention in powder, fired body and film form are described in detail.

Sintered Body (powder) Producing Process 1

Figure 2:
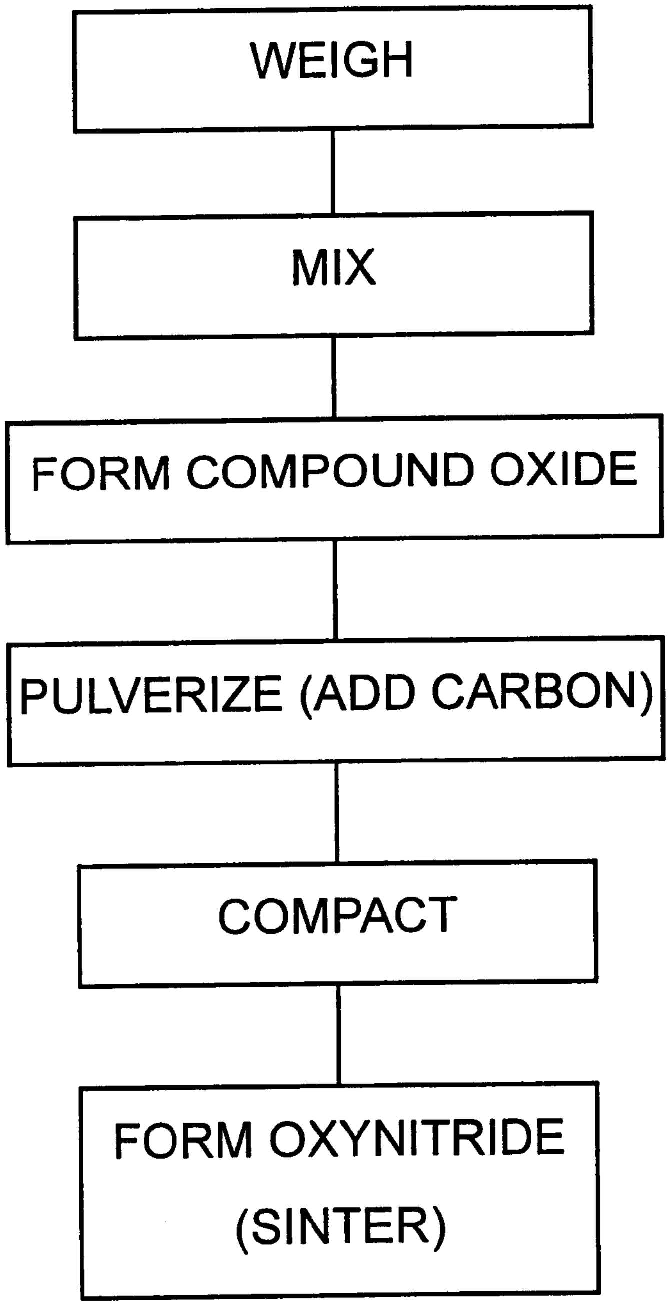
FIG. 2 is a flow diagram showing another process for producing an electron-emitting material in sintered body form according to the invention.
Figure 3:
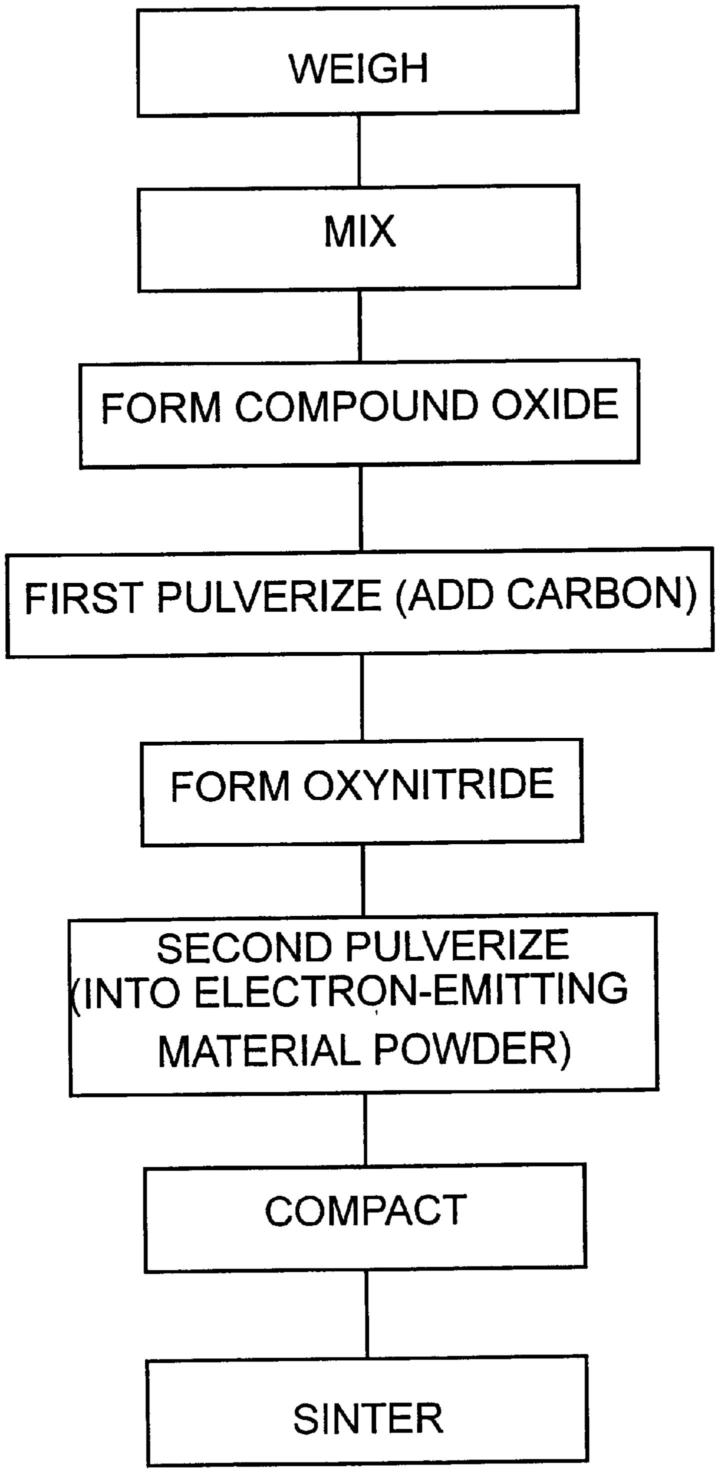
FIG. 3 is a flow diagram showing a further process for producing an electron-emitting material in powder or sintered body form according to the invention.

In producing the electron-emitting material of the invention in powder or fired body form, the formation of oxynitride may be effected under the above-described conditions and the remaining steps are not critical. For example, use may be made of the processes whose flow diagram is shown in FIGS. 1, 2 and 3, respectively. First, the steps of the process shown in FIG. 1 are described.

Weighing Step

The weighing step is to weigh starting materials in accordance with the final composition. The compounds used as the starting materials may be oxides and/or compounds which will convert into oxides upon firing, for example, carbonate and oxalate salts. Usually, $BaCO_3$, $SrCO_3$ and $CaCO_3$ are preferably used as the compound containing the first component, and $Ta_2O_5$, $ZrO_2$, $Nb_2O_5$, $TiO_2$ and $HfO_2$ are preferably used as the compound containing the second component. As the starting material of element M, use is preferably made of $MgCO_3$, $Sc_2O_3$, $Y_2O_3$, $La_2O_3$, $V_2O_5$, $Cr_2O_3$, $MoO_3$, $WO_3$, $Fe_2O_3$, NiO, and $Al_2O_3$.

Mixing Step

The mixing step is to mix the weighed amounts of starting materials to provide a source powder. For mixing operation, a method such as a ball mill, friction mill or co-precipitation method may be used. After mixing, the powder is dried by a heat drying or freeze drying method.

In the mixing step, carbon is added to the starting materials if necessary. Carbon may be wet mixed simultaneous with the mixing of starting materials. Alternatively, carbon may be added subsequent to the mixing of starting materials and dry mixed therewith. Since carbon has a relatively low specific gravity and is unlikely to disperse in the dispersing medium, a dispersant is added in the case of wet mixing, if necessary. The dispersing medium may be either an aqueous or organic system although the use of the aqueous system is preferable in consideration of the load on the environment.

The amount of carbon added is preferably up to 50 mass %, more preferably up to 20 mass % based on the starting materials. With a too large amount of carbon added, undesirably there may form a large amount of carbides and nitrides which do not contribute to electron emission. Another drawback associated with excess carbon addition is that after firing, there is left more carbon which will evaporate or gasify during use of the electron-emitting material. On the other hand, if the amount of carbon added is too small in the event that the container made of carbon or a furnace material containing carbon is not used, it may become difficult for oxynitride to form. Then in this event, the amount of carbon added is preferably at least 1 mass %, more preferably at least 2 mass % based on the starting materials. The type of carbon is not critical, and any type of carbon including graphite and amorphous carbon may be used. In the mixture, carbon should preferably have a mean particle size of up to 1 mm, and more preferably up to 500 $\mu$m. Carbon particles with a too large size may be difficult to uniformly disperse in the mixture and less reactive, so they are likely to be left after firing. The smaller the mean particle size of carbon powder, the better become the results. However, since a too small size is difficult to handle and disperse, the carbon powder preferably has a mean particle size of at least 0.01 μm. In order to improve the dispersibility of carbon powder, a dispersant may be used.

Oxynitride Forming Step

The oxynitride forming step is to fire the source powder in a nitrogen gas-containing atmosphere, preferably in a nitrogen gas stream, to form an electron-emitting material containing oxynitride perovskite. In this step, as previously mentioned, a furnace or container composed at least partially of carbon is used and/or carbon is placed in a furnace if desired. The firing temperature is preferably 800 to 2,000° C., and more preferably 1,100 to 1,700° C. Too low a firing temperature may retard the formation of oxynitride. If the firing temperature is too high, more carbides and nitrides form. In either case, the performance of electron-emitting material may become insufficient. Too high a firing temperature can also cause the material to be melted. The firing time or temperature holding time is usually about ½ to about 5 hours. Firing may be effected in a powder form or in a compact form of powder for ease of handling. Through firing, an oxynitride of the perovskite structure forms. In addition to the oxynitride, the carbide and/or nitride of the second component can simultaneously form, especially with a likelihood of carbide formation.

Since the carbon powder admixed with the source powder is consumed through reaction during firing in a nitrogen gas-containing atmosphere, no substantial amount of carbon is left in the fired body as long as an appropriately controlled amount of carbon has been admixed. Consequently, there is no need to remove the carbon powder from the electron-emitting material after firing. Where carbon powder having a large particle size is used in a relatively large amount, for example, the removal of carbon is sometimes necessary.

The nitrogen gas-containing atmosphere is most preferably 100% nitrogen, but may contain an inert gas such as argon, a reducing gas such as CO or $H_2$, or a carbonaceous gas such as benzene or carbon monoxide. It is recommended that nitrogen accounts for at least 50% of the atmosphere. In general, the carbonaceous gas is more difficult to handle than nitrogen and more difficult to form oxynitride perovskite in a stable manner.

When firing is effected in a nitrogen gas stream, the flow rate of nitrogen gas per unit area in proximity to a material to be fired, that is, the flow rate of nitrogen gas per unit area in a cross section perpendicular to the direction of nitrogen stream in a space proximate to a material to be fired is preferably at least 0.0001 m/s, and especially at least 0.001 m/s. Supplying nitrogen gas to the material to be fired at such a flow rate permits an oxynitride to quickly and uniformly form within the material. The flow rate of nitrogen gas is set within a suitable range as long as the material to be fired may not be scattered. The upper limit of flow rate is not critical although a flow rate in excess of 5 m/s is unnecessary in most cases.

Since the oxynitride tends to be decomposed when heated in an oxygen gas-containing atmosphere, the firing atmosphere is preferably maintained at a low oxygen partial pressure. Since the susceptibility of oxynitride to decomposition varies with a heating temperature, the oxygen partial pressure is controlled as appropriate in accordance with the firing temperature. Preferably the oxygen partial pressure is up to $5.0\times10^3$ Pa (0.05 atm.), more preferably up to $1.0\times10^3$ Pa (0.01 atm.), and most preferably up to $0.1\times10^3$ Pa (0.001 atm.). The lower limit of the oxygen partial pressure is not critical and the oxygen partial pressure may be zero. When a conventional firing device is used, the firing atmosphere generally has an oxygen partial pressure of at least 0.1 Pa.

Pulverizing Step

The pulverizing step is to pulverize the electron-emitting material resulting from the oxynitride forming step, yielding an electron-emitting material powder. A ball mill or pneumatic atomizer may be used for pulverization. Since the pulverizing step ensures that the electron-emitting material has a reduced particle size and a narrow particle size distribution, it is effective in improving the electron emission capability and minimizing the variation thereof. In this regard, it is recommended to incorporate the pulverizing step. Where it is desired to finally provide a sintered body, the process goes to the subsequent compacting step.

After the pulverizing step, a granulating step is incorporated if necessary. In the granulating step, an aqueous solution of an organic binder is added to the pulverized powder whereby granules are formed. Exemplary organic binders are polyvinyl alcohol (PVA), polyethylene glycol (PEG), and polyethylene oxide (PEO). Granulating means is not critical. For example, a jet granulator, extrusion granulator, tumbling granulator, or mortar and pestle may be used.

Compacting Step

The compacting step is to compression mold the powder into a compact of the desired electrode shape.

Sintering Step

The sintering step is to fire the compact into a sintered body or electrode. Like the oxynitride forming step, the sintering step is conducted in a nitrogen gas-containing atmosphere in order to prevent decomposition of the once formed oxynitride. In the sintering step, it is unnecessary to dispose carbon in proximity to the compact to be fired. The nitrogen gas-containing atmosphere used herein is the same as described in conjunction of the oxynitride forming step, and its oxygen partial pressure is also the same. The firing temperature is preferably 800 to 2,000° C. and more preferably 1,100 to 1,700° C. Too low a firing temperature may result in a sintered body with an insufficient density whereas too high a firing temperature may cause a compositional deviation or reaction with the setter. The firing time is usually about ½ to about 5 hours.

The process shown in FIG. 1 may be modified such that the mixing step is immediately followed by the compacting step and the sintering step also serves as the oxynitride forming step. When carbon powder is admixed with the source powder in this modified process, the carbon powder is present in the compact. During sintering of the compact, carbon in the compact reacts and is thus consumed. The consumption of carbon can have an influence on the dimensional precision and density of the sintered body. By contrast, the process of FIG. 1 eliminates such a concern about the influence of carbon consumption during sintering of the compact because the carbon has been consumed in the oxynitride forming step prior to the compacting step.

Sintered Body Producing Process 2

The process shown in FIG. 2 differs from the process of FIG. 1 in that a compound oxide forming step is provided prior to the oxynitride forming step, and the oxynitride forming step also serves as a sintering step. When an oxynitride is directly produced by heat treating at relatively high temperature a mixture of starting materials including a highly reactive material such as $BaCO_3$ as in the above-mentioned process 1, the starting materials can react with a furnace material such as a zirconia setter during firing. The reaction of the starting materials with the furnace material during firing sometimes causes the furnace material to be consumed or the electron-emitting material to be altered in characteristics or shape (in the case of a compact). This problem can be overcome by providing the compound oxide forming step of effecting heat treatment at a relatively low temperature to form a compound oxide, prior to the oxynitride forming step. The steps of the process shown in FIG. 2 are now described.

Weighing Step

The weighing step is the same as in the process of FIG. 1.

Mixing Step

The mixing step is the same as in the process of FIG. 1 except that no carbon is admixed.

Compound Oxide Forming Step

The source powder is fired in an oxidizing atmosphere such as air to form an intermediate product containing a compound oxide as represented by $M^{I}_{5}M^{II}_{4}O_{15}$. The compound oxide in the intermediate product is at least one of the compound oxides which can be contained in the electron-emitting material of the invention. Preferably the intermediate product resulting from firing consists essentially of a compound oxide or compound oxides. The firing temperature is preferably 800 to 1,700° C., more preferably 800 to 1,500° C., and most preferably 900 to 1,300° C. At too low a firing temperature, a compound oxide as represented by $M^{I}_{5}M^{II}_{4}O_{15}$ is unlikely to form. Too high a firing temperature, on the other hand, drives sintering to such an extent as to restrain pulverization and causes the compound oxide to be melted or decomposed. The firing time may be about ½ to about 5 hours. Firing may be effected in a powder form or in a compact form of powder for ease of handling. It is noted that the compound oxide forming step may be carried out in a reducing atmosphere. The compound oxide can be formed by firing even in a reducing atmosphere. However, firing in air is generally preferable because the establishment of the reducing atmosphere requires atmosphere control and the performance of the finally obtained electron-emitting material does not depend on the firing atmosphere in the compound oxide forming step.

Pulverizing Step

The pulverizing step is the same as in the process of FIG. 1. Like the mixing step shown in FIG. 1, carbon is admixed in the pulverizing step if necessary.

Compacting Step

The compacting step is the same as in the process of FIG. 1.

Oxynitride Forming Step

The compact is fired under conditions as in the oxynitride forming step shown in FIG. 1, yielding a sintered body of electron-emitting material containing an oxynitride.

Sintered Body (powder) Producing Process 3

The process shown in FIG. 3 is the same as the process of FIG. 2 in that a compound oxide forming step is provided prior to the oxynitride forming step. While the oxynitride forming step also serves as a firing step in the process of FIG. 2, the process of FIG. 3 differs from the process of FIG. 2 in that the oxynitride forming step is followed by a second pulverizing step of pulverizing the mass into a powder, which is compacted and fired to provide a sintered body. When carbon is added in the pulverizing step in the process of FIG. 2, the carbon in the compact reacts during firing of the compact. The consumption of carbon can affect the dimensional precision and density of the sintered body. By contrast, the process of FIG. 3 eliminates such concern about the carbon consumption during sintering of the compact because compacting is done after carbon has been consumed in the oxynitride forming step. The steps of the process shown in FIG. 3 are now described.

Weighing Step

The weighing step is the same as in the process of FIG. 2.

Mixing Step

The mixing step is the same as in the process of FIG. 2.

Compound Oxide Forming Step

The compound oxide forming step is the same as in the process of FIG. 2, yielding a compound oxide.

First Pulverizing Step

The pulverizing step is the same as in the process of FIG. 2.

Oxynitride Forming Step

The oxynitride forming step is the same as in the process of FIG. 2, yielding an electron-emitting material containing an oxynitride. Firing may be effected in a powder form or in a compact form of powder for ease of handling.

Second Pulverizing Step

The pulverizing step is the same as the first pulverizing step except that no carbon is admixed, yielding an electron-emitting material powder.

Compacting Step

The compacting step is the same as in the process of FIG. 2.

Firing Step

As in the sintering step shown in FIG. 1, the compact is fired under sufficient conditions to prevent decomposition of the oxynitride, yielding a sintered body.

Figure 4:
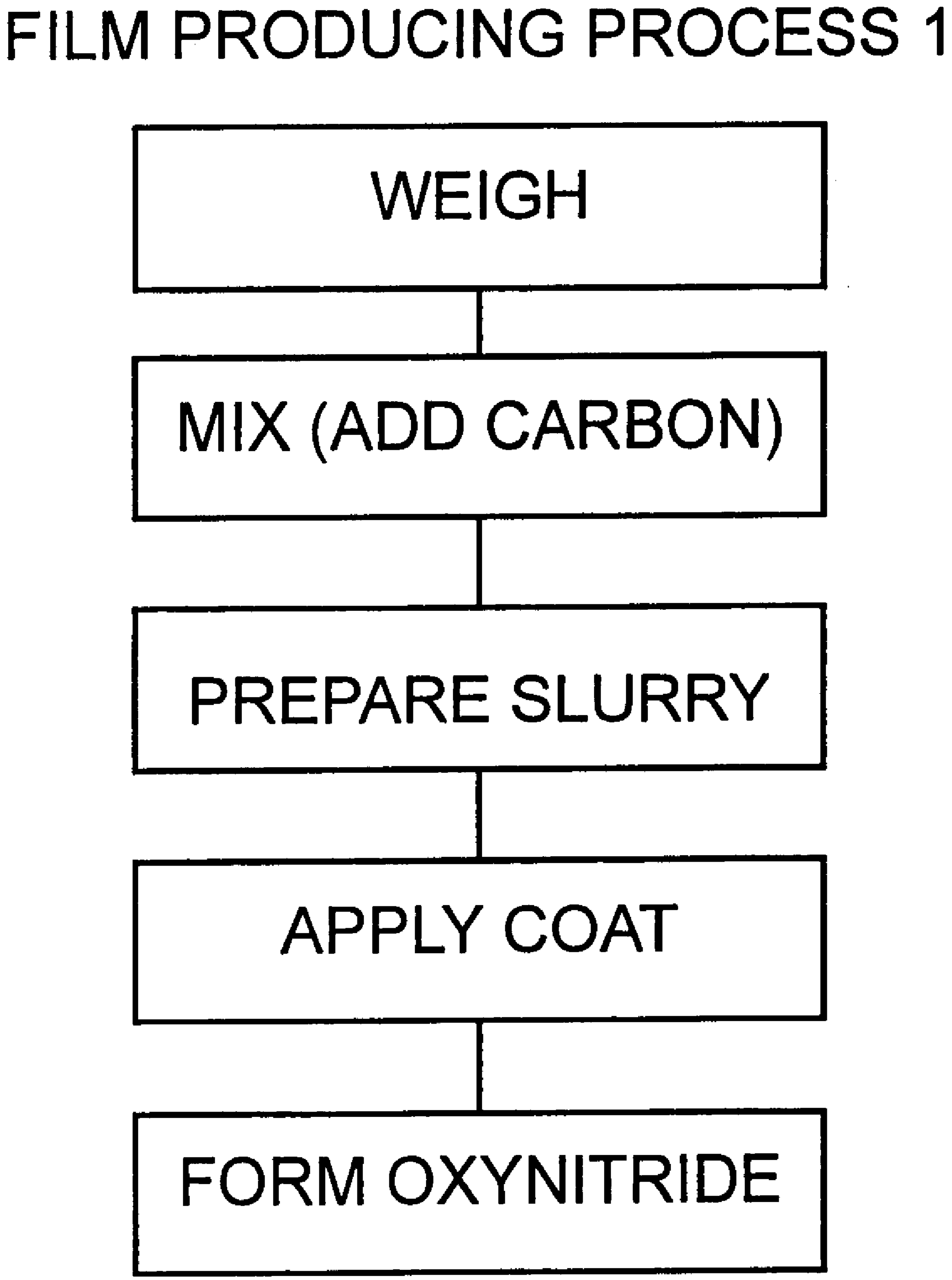
FIG. 4 is a flow diagram showing a process for producing an electron-emitting material in film form according to the invention.

Film Preparing Process 1

Where it is desired to prepare the electron-emitting material in film form, the formation of oxynitride is carried out under the above-mentioned conditions, and the remaining steps are not critical. For example, use may be made of the processes whose flow diagram is shown in FIGS. 4 to 7, respectively. First, the steps of the process shown in FIG. 4 are described.

Weighing Step

The weighing step is the same as in the process of FIG. 1.

Mixing Step

The mixing step is the same as in the process of FIG. 1. The mean particle size of carbon in the mixture may be determined as appropriate in accordance with the desired thickness and density of a coating.

Slurry Forming Step

The slurry forming step is to form a slurry of a mixture of starting materials. When wet mixing is used in the mixing step, it is preferred that the mixing step also serve as the slurry forming step. The dispersing medium used in slurry formation may be either an aqueous medium or an organic solvent medium as previously described in conjunction with the mixing step.

In the slurry forming step, a binder is added if necessary. The type of binder is not critical. For the organic dispersing medium, a choice may be made among various well-known binders such as ethyl cellulose and polyvinyl butyral. For the aqueous dispersing medium, a choice may be made among, for example, polyvinyl alcohol, cellulose and water-soluble acrylic resins.

The solids concentration of the slurry or the viscosity of the slurry may be determined as appropriate in accordance with the coat forming method. In most cases, the slurry preferably has a viscosity of about 0.01 to $10^5$ mPa-s.

Coat Forming Step

In this step, a coat is formed on the surface of a substrate using the above-prepared slurry. The material of the substrate is not critical and may be various metals or ceramics.

The coat forming method is not critical. Depending on the desired thickness of a coat, a choice may be made among various methods, for example, printing, doctor blade, and spray methods.

Oxynitride Forming Step

The oxynitride forming step is to fire the coat in a nitrogen gas-containing atmosphere, yielding an electron-emitting material film containing oxynitride perovskite. Preferred conditions in this step are the same as in the oxynitride forming step in the process of FIG. 1.

Film Preparing Process 2

Figure 5:
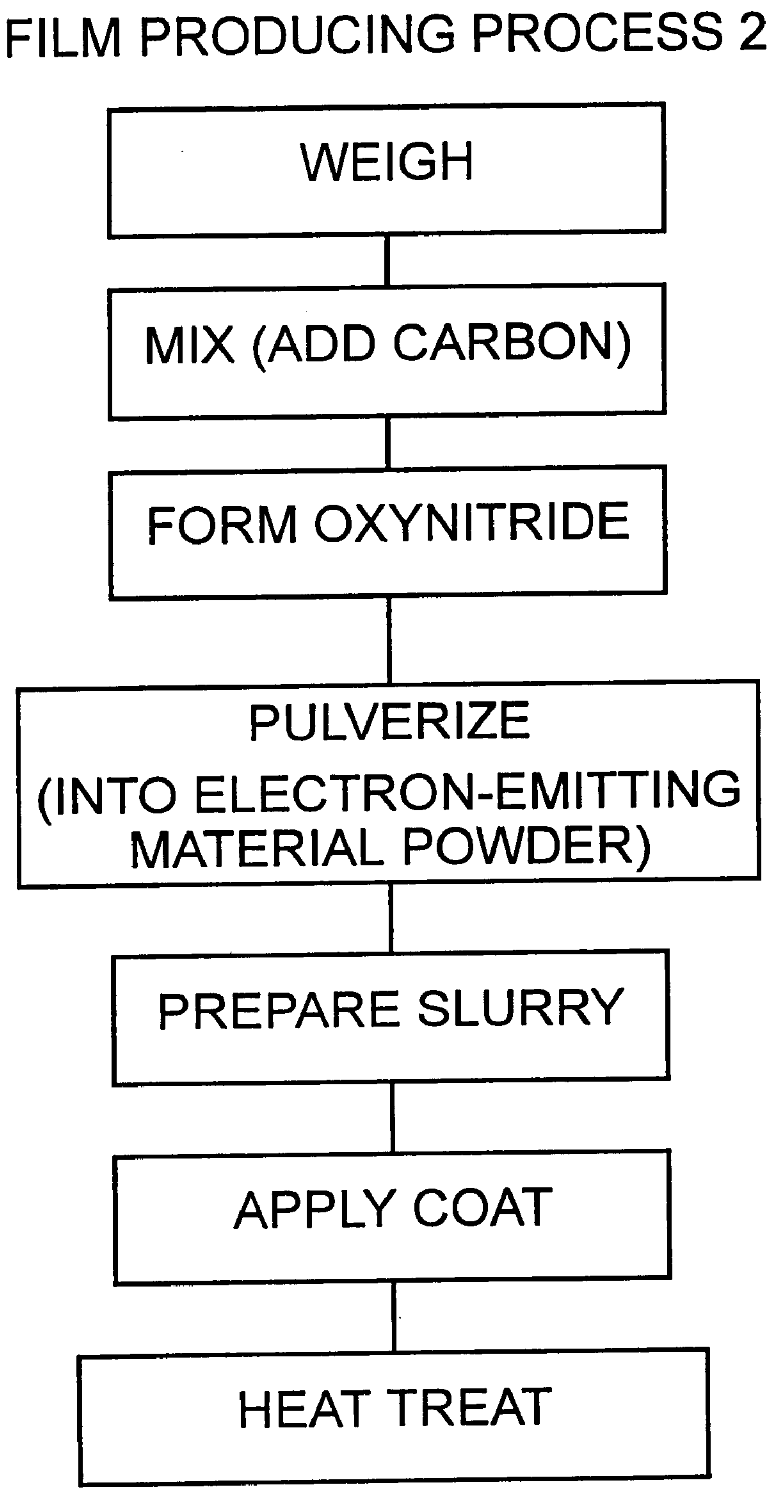
FIG. 5 is a flow diagram showing another process for producing an electron-emitting material in film form according to the invention.

The process shown in FIG. 5 differs from the process of FIG. 4 in that oxynitride perovskite is formed prior to the formation of a coat. When the coat contains carbon powder in the process of FIG. 4, the carbon in the coat reacts during firing. The consumption of carbon can affect the dimensional precision and density of the electron-emitting material film. By contrast, the process of FIG. 5 eliminates such concern about the influence of carbon consumption because the coat is formed after carbon has been consumed in the oxynitride forming step preceding the coat forming step. The respective steps are now described.

Weighing Step

The weighing step is the same as in the process of FIG. 4.

Mixing Step

The mixing step is the same as in the process of FIG. 4.

Oxynitride Forming Step

In this embodiment, a mixture of starting materials and optional carbon, which may form a powder form or a compact form of powder for ease of handling, is fired under the same conditions as in the oxynitride forming step in FIG. 4, yielding an electron-emitting material containing oxynitride perovskite.

Pulverizing Step

The pulverizing step is to pulverize the electron-emitting material if necessary. For pulverization, a ball mill or pneumatic atomizer may be used.

Slurry Forming Step

The slurry forming step is the same as in the process of FIG. 4 except that the electron-emitting material is used. When wet milling is employed in the preceding pulverizing step, the pulverizing step can also serve as the slurry forming step.

Coat Forming Step

The coat forming step is the same as in the process of FIG. 4.

Heat Treating Step

In the heat treating step, the coat is dried and if a binder has been added, the binder is removed. Heat treatment may be carried out at a temperature of at least 80° C., typically 150 to 2,000° C. for about ½ to about 20 hours. It is acceptable that the coat is sintered and consolidated through the heat treatment, but it is preferred in some cases that an electron-emitting material film be not a consolidated sintered body. In the latter case, heat treatment is preferably carried out under the conditions that do not cause sintering of particles, for example, at a temperature below 1,600° C. for about ½ to about 5 hours.

The atmosphere during heat treatment may be selected as appropriate so that the once formed oxynitride perovskite may not be decomposed. More particularly, an oxidizing atmosphere such as air is acceptable in the case of heat treatment at relatively low temperatures. A non-oxidizing atmosphere consisting of a neutral gas such as nitrogen gas or an inert gas such as argon is recommended in the case of heat treatment at relatively high temperatures. The oxygen partial pressure of the non-oxidizing atmosphere is preferably set within the range previously described in conjunction with the oxynitride forming step. In the case of heat treatment at higher temperatures, as in the oxynitride forming step, it is preferred that the coating film disposed in proximity to carbon is heat treated in a nitrogen gas-containing atmosphere. Namely, a container or furnace which is at least partially composed of carbon may be used, and/or carbon may be placed in a furnace. The preferred conditions of the nitrogen gas-containing atmosphere are the same as those of the nitrogen gas-containing atmosphere previously described in conjunction with the oxynitride forming step.

Film Preparing Process 3

Figure 6:
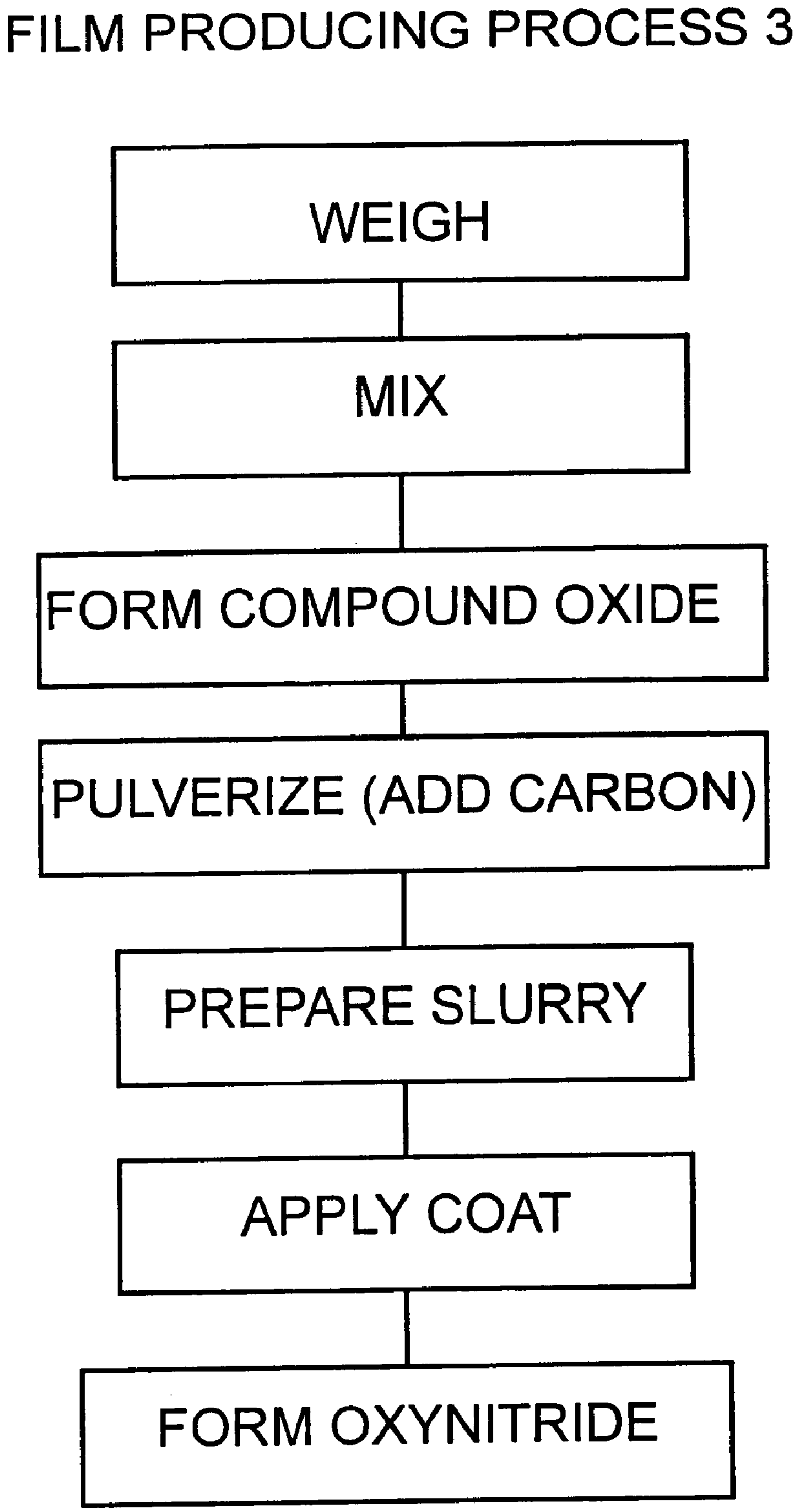
FIG. 6 is a flow diagram showing a further process for producing an electron-emitting material in film form according to the invention.

The process shown in FIG. 6 differs from the process of FIG. 4 in that once a compound oxide as represented by $M^{I}_{5}M^{II}_{4}O_{15}$ is formed in the compound oxide forming step, a powder containing the compound oxide is used as the source powder. In the process of FIG. 4, the powder of starting materials is formed into a slurry, which is applied to the substrate surface to form a coat, in which an oxynitride is formed by firing. During firing, the coat can react with the substrate, detracting from the characteristics of the electron-emitting material film. By contrast, the process of FIG. 6 wherein once a compound oxide is formed, a coat comprising a powder containing the compound oxide is fired minimizes the likelihood of reaction between the coat and the substrate. Therefore, the process of FIG. 6 is effective where it is desired to strictly avoid the reaction with the substrate. The respective steps are now described.

Weighing Step

The weighing step is the same as in the process of FIG. 4.

Mixing Step

The mixing step is the same as in the process of FIG. 4 except that no carbon is added.

Compound Oxide Forming Step

The source powder is fired in an oxidizing atmosphere such as air to form an intermediate product containing a compound oxide as represented by $M^{I}_{5}M^{II}_{4}O_{15}$, as in the compound oxide forming step shown in FIG. 2.

Pulverizing Step

The pulverizing step is the same as in the process of FIG. 4. Like the mixing step shown in FIG. 4, carbon is admixed in the pulverizing step if necessary.

Slurry Forming Step

The slurry forming step is the same as in the process of FIG. 4 except that the intermediate product is used.

Coat Forming Step

The coat forming step is the same as in the process of FIG. 4.

Oxynitride Forming Step

The oxynitride forming step is the same as in the process of FIG. 4, yielding oxynitride perovskite.

Film Preparing Process 4

Figure 7:
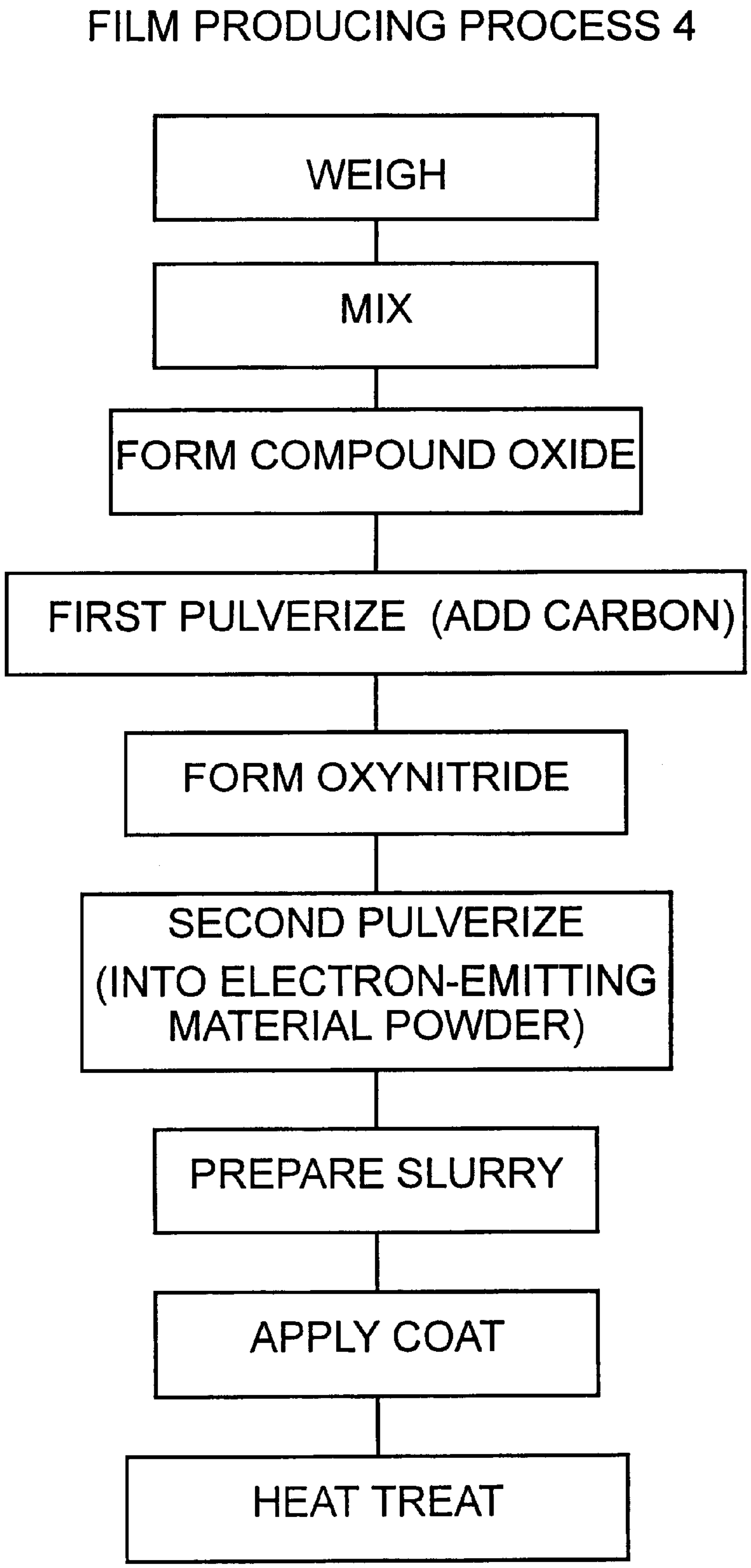
FIG. 7 is a flow diagram showing a still further process for producing an electron-emitting material in film form according to the invention.

The process shown in FIG. 7 differs from the process of FIG. 6 in that an oxynitride forming step is provided to form oxynitride perovskite prior to the formation of a coat. Differently stated, the process of FIG. 7 differs from the process of FIG. 5 in that once a compound oxide is formed in the compound oxide forming step, a powder containing the compound oxide is used as the source powder. Therefore, the process of FIG. 7 also eliminates any concern about the influence of carbon consumption on the dimensional precision and density of a coating film. The respective steps are now described.

Weighing Step

The weighing step is the same as in the process of FIG. 6.

Mixing Step

The mixing step is the same as in the process of FIG. 6.

Compound Oxide Forming Step

The compound oxide forming step is the same as in the process of FIG. 6, forming a compound oxide.

First Pulverizing Step

The pulverizing step is the same as in the process of FIG. 6.

Oxynitride Forming Step

The oxynitride forming step is the same as in the process of FIG. 6, yielding an electron-emitting material containing oxynitride.

Second Pulverizing Step

The pulverizing step is the same as in the process of FIG. 6 except that no carbon is added.

Slurry Forming Step

The slurry forming step is the same as in the process of FIG. 6 except that the electron-emitting material is used.

Coat Forming Step

The coat forming step is the same as in the process of FIG. 6.

Heat Treating Step

The heat treating step is the same as in the process of FIG. 5.

Electrode

Figure 11:
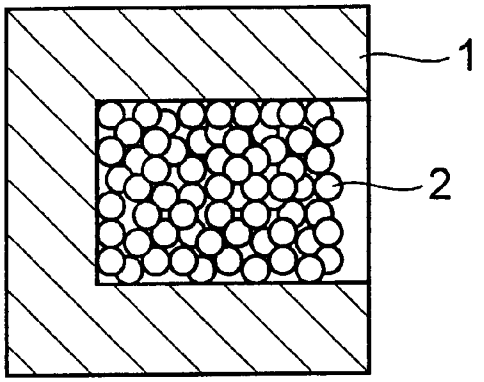
FIG. 11 is a cross-sectional view of one exemplary electrode.

The electron-emitting material of the invention is applicable to electrodes for use in a variety of discharge lamps such as fluorescent lamps. The electrode may be either of hot cathode operation or of cold cathode operation. In an electrode of the structure comprising a tubular container 1 having one end open and another end closed which is filled with granules 2 of ceramic semiconductor as shown in FIG. 11, the electron-emitting material of the invention may be used as the ceramic semiconductor and/or in the tubular container 1. In addition to the structure illustrated in FIG. 11, the electron-emitting material of the invention may be formed into a sintered body of rod shape, which is inserted and secured in the hollow interior of a tungsten coil to construct an electrode.

Where the electron-emitting material is utilized in film form, a film of the electron-emitting material is formed on a surface of a substrate such as a linear member (e.g., a coiled filament or double coiled filament) or a planar member to construct an electrode. The material of which the substrate is constructed may be selected from various metals such as W, Mo, Ta, Ni, Zr, and Ti, alloys containing at least one of these metals, ceramics such as $ZrO_2$, $Al_2O_3$, MgO, AlN, and $Si_3N_4$, and ceramics containing at least one of these ceramics, such as SiAlON. Additionally, a multilayer electrode may be obtained by laminating a coating containing an oxynitride-bearing powder or a source powder which will form an oxynitride upon firing and a coating containing a conductive material by a printing or sheeting method, followed by sintering.

Where the electron-emitting material is utilized in film form, the film may have a thickness of about 5 to 1,000 $\mu$m. In the electron-emitting material film, the electron-emitting material preferably has a mean particle size of 0.05 to 20 $\mu$m, and more preferably 0.1 to 10 $\mu$m. In order to further reduce the mean particle size in the film, microscopic particles must be used, but are difficult to handle. Such microscopic particles tend to agglomerate into secondary particles, on account of which the particle size distribution is spread to make it difficult to form a uniform coating. If the mean particle size in the coating is too large, electron-emitting material particles may spall off, the coating operation become difficult, and the electron emission become inefficient.

Besides the electrodes for fluorescent lamps and discharge lamps, the electron-emitting material of the invention is applicable to various other electrodes, for example, electrodes in electric discharge lamps, electrodes in cathode ray tube electron guns, electrodes in plasma displays, electrodes in field emission displays, electrodes in fluorescent display tubes, and electrodes in electron microscopes. In any of these applications, the advantages of the invention including an extended lifetime and improved characteristics are available.

Discharge Lamp

Figure 12:
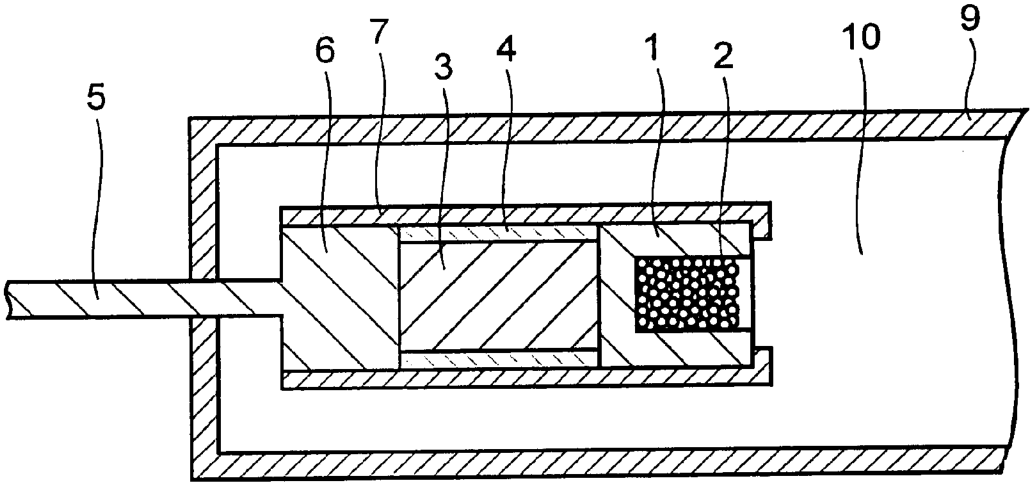
FIG. 12 is a cross-sectional view of one exemplary discharge lamp of hot cathode operation.

FIG. 12 illustrates one exemplary construction of a discharge lamp capable of hot cathode operation and having the electrode shown in FIG. 11. Only an end portion of the lamp is depicted. This discharge lamp can be constructed to an elongated bulb structure.

The discharge lamp includes a sealed bulb 9 having a phosphor coated on its inside surface. The bulb 9 contains a rare gas such as He, Ne, Ar, Kr, Xe or a mixture thereof. An appropriate pressure of the rare gas in the bulb 9 is usually 1,330 to 22,600 Pa. By setting the pressure of the rare gas within this range, the lamp is endowed with a greater luminance and a longer lifetime.

A lead 5 is extended through one end wall of the bulb 9. Formed at the inside end of the lead 5 located within the bulb 9 is an enlargement 6 over which a conductive pipe 7 is fitted. The lead enlargement 6 may be omitted if the lead 5 can be coupled to the conductive pipe 7 by other means. The conductive pipe 7 is made of high electrical conductivity materials. Inter alia, a high electrical conductivity material releasing a minimal amount of gas in vacuum, for example, nickel is preferred because the generation of impurity-containing gases during manufacture of the discharge lamp is suppressed to ensure that the lamp produces a stable discharge. Alternatively, the conductive pipe 7 is made of ceramics. The container 1 which is loaded with the electron-emitting material 2 is closely fitted within the conductive pipe 7. A metal pipe 4 filled with a mercury dispenser material 3 is disposed between the container 1 and the lead enlargement 6 in the conductive pipe 7. The metal pipe 4 is a hollow cylinder having both ends open and made of a metal such as nickel. The area of the conductive pipe 7 surrounding the metal pipe 4 is provided with a slit-shaped opening (not shown). Mercury in the mercury dispenser material 3 is vaporized upon application of heat as by RF heating of the metal pipe 4, passed between the metal pipe 4 and the lead enlargement 6 and between the metal pipe 4 and the container 1, and released to a discharge space 10 through the opening. The opening is not limited to the slit shape insofar as it permits mercury vapor to escape therethrough and does not inhibit the accommodation of the container 1. The mercury dispenser material 3 itself is not essential if a provision is made such that mercury may be supplied within the bulb during the sealing step.

Another discharge lamp is of cold cathode operation. In the prior art, a tubular member of a metal such as nickel is generally used as the cold cathode. When an emitter such as BaO is used, the tubular member is considered as an electrode substrate and a coat of the emitter is applied to the circumferential surface of the substrate. In the event wherein the invention is applied to the electrode of the cold cathode discharge lamp, a coat containing the electron-emitting material is applied to the surface of the electrode substrate instead of the conventional emitter coat. The electrode substrate is preferably constructed of high-melting metals such as W, Ti, Zr, Mo and Ta as well as Ni, and alloys containing at least one of these metals.

Figure 13:
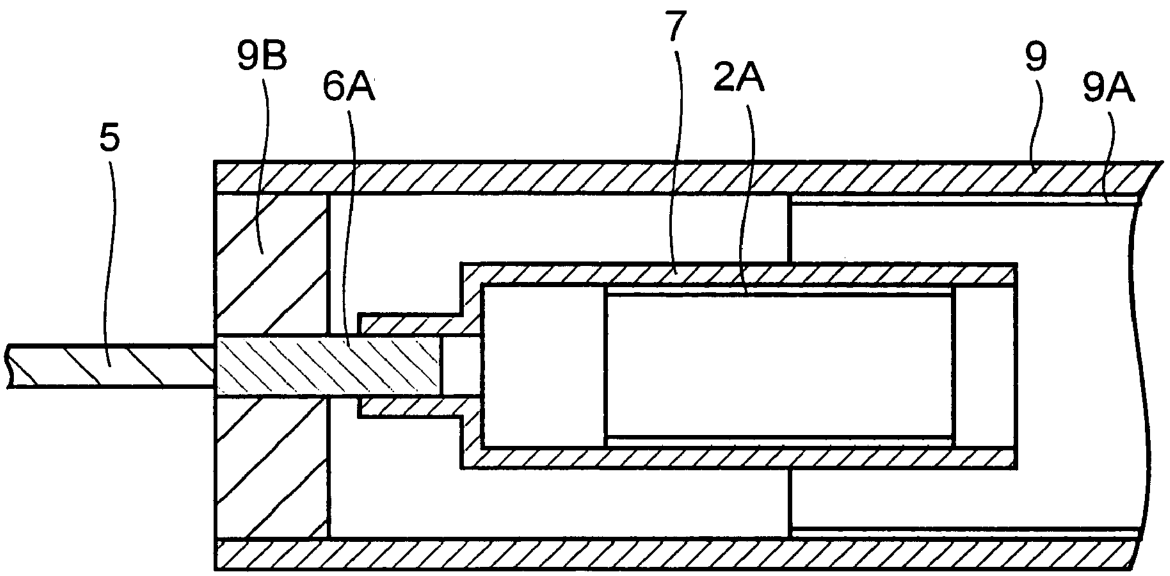
FIG. 13 is a cross-sectional view of one exemplary discharge lamp of cold cathode operation.

FIG. 13 illustrates one exemplary construction of a discharge lamp capable of cold cathode operation. Only an end portion of the lamp is depicted. The lamp includes a sealed bulb 9 having a phosphor 9A coated on its inside surface. The bulb 9 contains a rare gas. A lead 5 is extended through one end of the bulb 9. To the inside end of the lead 5 located within the bulb 9 is connected an in-lead 6A which is extended through a stem 9B closing the bulb end. The in-lead 6A is connected to a conductive pipe 7 serving as an electrode substrate. The conductive pipe 7 has an electron-emitting material film 2A formed on its inside surface. This discharge lamp is of the structure that allows mercury to be supplied within the bulb during the sealing step.

The electrode using the electron-emitting material of the invention is applicable to various other devices without being limited to the discharge lamps of the illustrated structures. For example, the electrode is applicable to the discharge lamps of the structure proposed in the above-listed patent publications of the assignee of the present invention.

EXAMPLE

Example 1

In accordance with the process shown in FIG. 1, an electrode sample of the structure shown in FIG. 11 including a cylindrical container 1 having one end open and another end closed which is filled with granules 2 of a ceramic semiconductor was manufactured by the following procedure.

First, Ba was selected as the first component, and Ta and Zr were selected as the second component. As the starting materials for these elements, there were furnished $BaCO_3$, $Ta_2O_5$ and $ZrO_2$.

The starting materials were weighed so as to give a molar ratio of Ba, Ta and Zr as shown in Table 1-1. They were wet milled for 20 hours in a ball mill.

The mixture of starting materials was dried. Carbon powder having a mean particle size of 50 $\mu$m in an amount of 5 mass % was added to the mixture. The resulting mixture was dry milled and then molded under a pressure of 10 MPa. The compact was subjected to an oxynitride forming treatment wherein the compact was placed in a carbon container having an open top. A carbon lid was closed over the container, with a gap being left between the container and the lid. In a nitrogen gas stream, the compact was fired at 1,300° C. for 2 hours. Nitrogen gas was fed through the furnace so as to give a flow rate of 0.01 m/s per unit area in a cross section perpendicular to the direction of gas stream in a space in proximity to the compact. The firing atmosphere had an oxygen partial pressure of 20 Pa (0.0002 atm.). The fired compact or electron-emitting material was wet pulverized for 20 hours in a ball mill. After drying, an aqueous solution of polyvinyl alcohol was added to the material to form a slurry. Using a mortar and pestle, the slurry was granulated.

The granules were compacted under a pressure of 200 MPa, yielding a cylindrical compact having one end open and another end closed (density 3.69 g/cm$^3$). The compact was filled with the granules and placed in an electric furnace equipped with a carbon heater and lined with a carbon insulator. In a nitrogen gas stream, the compact was fired at 1,600° C. for 2 hours, yielding electrode samples as shown in Table 1-1. The nitrogen gas flow rate and the oxygen partial pressure in the firing step were the same as in the oxynitride forming treatment. The electrode samples were dimensioned to an outer diameter of 2.3 mm, an inner diameter (diameter of granule-accommodating space) of 1.7 mm, and a length of 1.7 mm. The container had a density of 8.2 g/cm$^3$, which is more than 90% of the theoretical density determined from the crystal structure. For these samples, the compositional ratio of metal elements was substantially the same as that of starting materials. Table 1-1 also shows X/Y for the respective samples. It is noted that the compositional ratio of metal elements was determined by fluorescent x-ray analysis.

In accordance with the process of JP-A 9-129177 by the same assignee of the present invention, a comparative electrode sample was fabricated by the following procedure. First, a mixture of the above-mentioned starting materials was molded under a pressure of 100 MPa and fired in air for 2 hours at 1,100° C. The fired body was similarly subjected to wet milling, drying and granulation. The granules were compression molded into a compact. The compact filled with the granules was entirely embedded in carbon powder and fired at 1,600° C. for 2 hours in a nitrogen gas stream. Nitrogen gas was fed through the furnace so as to give a flow rate of 0.00005 m/s per unit area in a cross section perpendicular to the direction of gas stream in a space in proximity to the compact. The firing atmosphere had an oxygen partial pressure of 20 Pa (0.0002 atm.).

These electrode samples were examined by x-ray diffractometry. For those samples that had undergone the oxynitride forming step, that is, the samples obtained by admixing carbon powder and firing in a nitrogen gas stream, peaks attributable to the oxynitride perovskite ($M^IM^{II}O_2N$ type crystal) and peaks attributable to the carbide of the second component were observed as shown in FIG. 8. Note that FIG. 8 is an x-ray diffraction pattern of sample No. 104 in Table 1-1. It is seen in FIG. 8 that the sample is a single phase of oxynitride perovskite except for the carbide. By contrast, in the comparative sample, it was ascertained that no oxynitride perovskite formed and only oxides composed mainly of $M^I{}_5M^{II}{}_4O_{15}$ type crystals and a carbide (TaC) formed.

Each of the electrode samples was incorporated in a discharge lamp having a bulb with an overall length of 100 mm and an outer diameter of 5 mm, with other parameters including fill gas Ar, fill gas pressure 9.3 kPa, filler Hg, drive source frequency 30 kHz, and lamp current 30 mA. A continuous burning test was carried out, during which the operating temperature was about 1,100° C. Each electrode sample showed stable hot cathode operation in the range of 900 to 1,400° C.

Table 1-1 also shows the luminance retentivity of the discharge lamps having the respective electrode samples incorporated therein. The luminance retentivity is a percentage of a luminance after 3,000 hours of continuous burning relative to an initial luminance (100%) which is a luminance after 100 hours of continuous burning. The luminance of the discharge lamp was determined by measuring the surface luminance of the bulb at a position spaced 5 mm from the tip of the electrode toward the longitudinal center of the bulb, by means of a luminance meter.

TABLE 1-1

| Sample | Molar ratio | | | | | Luminance retentivity |
|---|---|---|---|---|---|---|
| No. | Ba | Ta | Zr | X/Y | Product | (%) |
| 101* | 0.8 | 0.9 | 0.1 | 0.8 | oxide | 77 |
| 102 | 0.8 | 0.9 | 0.1 | 0.8 | oxynitride | 94 |
| 103* | 1.0 | 0.9 | 0.1 | 1.0 | oxide | 78 |
| 104 | 1.0 | 0.9 | 0.1 | 1.0 | oxynitride | 96 |
| 105* | 1.2 | 0.9 | 0.1 | 1.2 | oxide | 75 |
| 106 | 1.2 | 0.9 | 0.1 | 1.2 | oxynitride | 91 |

*comparison

As seen from Table 1-1, the inventive samples containing oxynitride perovskite give a higher luminance retentivity than the comparative samples consisting of oxides. In the discharge lamps using the comparative samples, blackening of the bulb wall was observed, which indicated evaporation of the electron-emitting material and consumption of the electron-emitting material by sputtering.

Example 1-2

Electrode samples were fabricated as in Example 1-1 except that $BaCO_3$ and $Ta_2O_3$ were used as starting materials and mixed so as to give a molar ratio of Ba to Ta as shown in Table 1-2. These electrode samples were examined by x-ray diffractometry. Peaks attributable to $M^IM^{II}O_2N$ type crystals and peaks attributable to the carbide of the second component were observed, indicating that each sample was a single phase of oxynitride perovskite except for the carbide.

As in Example 1-1, these electrode samples were incorporated in discharge lamps. A continuous burning test was carried out as in Example 1-1, with the results shown in Table 1-2.

TABLE 1-2

| Sample | Molar ratio | | | Luminance |
|---|---|---|---|---|
| No. | Ba | Ta | X/Y | retentivity (%) |
| 107 | 0.8 | 1.0 | 0.8 | 90 |
| 108 | 1.0 | 1.0 | 1.0 | 95 |
| 109 | 1.2 | 1.0 | 1.2 | 93 |
| 110 | 1.5 | 1.0 | 1.5 | 91 |

It is evident from Table 1-2 that a high luminance retentivity is obtainable when X/Y is in the range between 0.8 and 1.5.

Example 1-3

Electrode samples were fabricated as in Example 1-1 except that the first and second components were combined as shown in Table 1-3. These electrode samples were examined by x-ray diffractometry. Peaks attributable to $M^IM^{II}O_2N$ type crystals and peaks attributable to the carbide of the second component were observed, indicating that each sample was a single phase of oxynitride perovskite except for the carbide.

As in Example 1-1, these electrode samples were incorporated in discharge lamps. A continuous burning test was carried out as in Example 1-1, with the results shown in Table 1-3. For comparison purposes, sample Nos. 104 and 108 are also shown in Table 1-3.

TABLE 1-3

| Sample | Molar ratio | | | | | | | | | Luminance retentivity |
|---|---|---|---|---|---|---|---|---|---|---|
| No. | Ba | Sr | Ca | Ta | Zr | Nb | Ti | Hf | X/Y | (%) |
| 108 | 1.0 | — | — | 1.0 | — | — | — | — | 1.0 | 95 |
| 111 | — | 1.0 | — | 1.0 | — | — | — | — | 1.0 | 92 |
| 112 | — | — | 1.0 | 1.0 | — | — | — | — | 1.0 | 90 |
| 113 | 0.5 | 0.5 | — | 1.0 | — | — | — | — | 1.0 | 94 |
| 114 | 0.5 | — | 0.5 | 1.0 | — | — | — | — | 1.0 | 94 |
| 115 | — | 0.5 | 0.5 | 1.0 | — | — | — | — | 1.0 | 93 |
| 116 | 0.4 | 0.3 | 0.3 | 1.0 | — | — | — | — | 1.0 | 92 |
| 104 | 1.0 | — | — | 0.9 | 0.1 | — | — | — | 1.0 | 96 |
| 117 | 1.0 | — | — | 0.7 | 0.3 | — | — | — | 1.0 | 95 |
| 118 | 1.0 | — | — | 0.5 | 0.5 | — | — | — | 1.0 | 93 |
| 119 | 1.0 | — | — | 0.3 | 0.7 | — | — | — | 1.0 | 93 |
| 120 | 1.0 | — | — | 0.1 | 0.9 | — | — | — | 1.0 | 91 |
| 121 | 1.0 | — | — | 0.5 | — | 0.5 | — | — | 1.0 | 94 |
| 122 | 1.0 | — | — | 0.5 | — | — | 0.5 | — | 1.0 | 93 |
| 123 | 1.0 | — | — | 0.5 | — | — | — | 0.5 | 1.0 | 92 |
| 124 | 1.0 | — | — | — | 0.5 | 0.5 | — | — | 1.0 | 90 |
| 125 | 1.0 | — | — | — | 0.5 | — | 0.5 | — | 1.0 | 88 |
| 126 | 1.0 | — | — | — | 0.5 | — | — | 0.5 | 1.0 | 87 |
| 127 | 1.0 | — | — | — | — | 0.5 | 0.5 | — | 1.0 | 86 |
| 128 | 1.0 | — | — | — | — | 0.5 | — | 0.5 | 1.0 | 87 |
| 129 | 1.0 | — | — | — | — | — | 0.5 | 0.5 | 1.0 | 87 |
| 130 | 1.0 | — | — | 0.4 | 0.3 | 0.3 | — | — | 1.0 | 90 |
| 131 | 1.0 | — | — | 0.4 | 0.3 | — | 0.3 | — | 1.0 | 89 |
| 132 | 1.0 | — | — | 0.4 | 0.3 | — | — | 0.3 | 1.0 | 88 |
| 133 | 1.0 | — | — | 0.4 | — | 0.3 | 0.3 | — | 1.0 | 90 |
| 134 | 1.0 | — | — | 0.4 | — | 0.3 | — | 0.3 | 1.0 | 87 |
| 135 | 1.0 | — | — | 0.4 | — | — | 0.3 | 0.3 | 1.0 | 88 |
| 136 | 1.0 | — | — | — | 0.4 | 0.3 | 0.3 | — | 1.0 | 86 |
| 137 | 1.0 | — | — | — | 0.4 | 0.3 | — | 0.3 | 1.0 | 87 |
| 138 | 1.0 | — | — | — | 0.4 | — | 0.3 | 0.3 | 1.0 | 88 |
| 139 | 1.0 | — | — | — | — | 0.4 | 0.3 | 0.3 | 1.0 | 89 |
| 140 | 1.0 | — | — | — | 0.3 | 0.3 | 0.2 | 0.2 | 1.0 | 88 |

* outside the preferred range

It is evident from Table 1-3 that a satisfactory luminance retentivity is achievable even with combinations other than the combination of Ba and Ta and the combination thereof with Zr.

As seen from Table 1-3, the luminance retentivity is 95% for sample No. 108 using only Ta as the second component and 96% for sample No. 104 in which Ta accounts for 90 at % of the second component. When these samples were tested as in Example 1-1 except that the continuous burning time was 6,000 hours, sample No. 108 showed a luminance retentivity of 78% and sample No. 104 showed a luminance retentivity of 90%. It is evident that reducing the content of Ta leads to an extended lifetime.

Example 1-4

Electrode samples were fabricated as sample No. 104 in Table 1-1 except that the oxide of element M was admixed with the starting materials as shown in Table 1-4. These electrode samples were examined by x-ray diffractometry. Peaks attributable to $M^IM^{II}O_2N$ type crystals and peaks attributable to the carbide of the second component were observed, indicating the formation of oxynitride perovskite.

As in Example 1-1, these electrode samples were incorporated in discharge lamps. A continuous burning test was carried out as in Example 1-1, with the results shown in Table 1-4. For comparison purposes, sample No. 104 is also shown in Table 1-4.

TABLE 1-4

| Sample | Molar ratio | | | | | Luminace retentivity |
|---|---|---|---|---|---|---|
| No. | Ba | Ta | Zr | X/Y | M:mass % | (%) |
| 104 | 1.0 | 0.9 | 0.1 | 1.0 | — | 96 |
| 141 | 1.0 | 0.9 | 0.1 | 1.0 | Y:3.0 | 95 |
| 142 | 1.0 | 0.9 | 0.1 | 1.0 | Y:5.0 | 93 |
| 143 | 1.0 | 0.9 | 0.1 | 1.0 | Y:10.0 | 94 |
| 144 | 1.0 | 0.9 | 0.1 | 1.0 | Y:15.0* | 80 |
| 145 | 1.0 | 0.9 | 0.1 | 1.0 | Mg:5.0 | 91 |
| 146 | 1.0 | 0.9 | 0.1 | 1.0 | Sc:5.0 | 96 |
| 147 | 1.0 | 0.9 | 0.1 | 1.0 | La:5.0 | 95 |
| 148 | 1.0 | 0.9 | 0.1 | 1.0 | V:5.0 | 93 |
| 149 | 1.0 | 0.9 | 0.1 | 1.0 | Cr:5.0 | 94 |
| 150 | 1.0 | 0.9 | 0.1 | 1.0 | Mo:5.0 | 90 |
| 151 | 1.0 | 0.9 | 0.1 | 1.0 | W:5.0 | 92 |
| 152 | 1.0 | 0.9 | 0.1 | 1.0 | Fe:5.0 | 88 |
| 153 | 1.0 | 0.9 | 0.1 | 1.0 | Ni:5.0 | 90 |
| 154 | 1.0 | 0.9 | 0.1 | 1.0 | Al:5.0 | 92 |

*: outside the preferred

It is evident from Table 1-4 that a satisfactory luminance retentivity is obtainable even when a compound of element M is included. It is noted that a drop of luminance retentivity is observed only when the content of M compound exceeds 10 mass %.

Example 1-5

Figure 9:
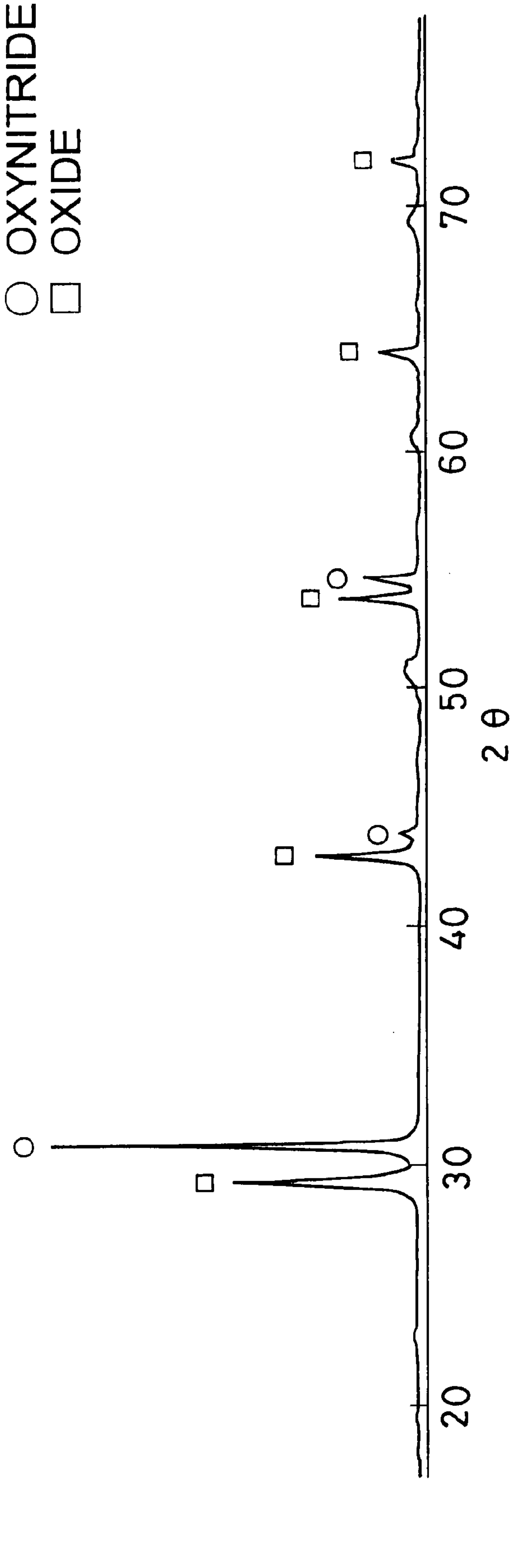
FIG. 9 is an x-ray diffraction pattern of another electron-emitting material according to the invention (Example 1–5).

An electrode sample was fabricated as sample No. 104 in Example 1-1 except that the amount of carbon powder added in the mixing step was 1 mass % based on the starting materials and the firing time in the oxynitride forming step as 5 hours. An x-ray diffraction pattern of this sample is shown in FIG. 9. As seen from FIG. 9, the sample contained a compound oxide ($M^{I}_5M^{II}_4O_{15}$ type crystals) in addition to oxynitride perovskite ($M^{I}M^{II}O_2N$ type crystals). It is seen that the maximum peak intensity of $M^{I}_5M^{II}_4O_{15}$ type crystals is less than 50% of that of $M^{I}M^{II}O_2N$ type crystals. This electrode sample was incorporated in a discharge lamp. A continuous burning test was carried out, finding a luminance retentivity as high as 85%.

In Examples 1-1 through 1-5, all the inventive samples had a resistivity at room temperature in the range of $10^{-6}$ to $10^3$ Ωm.

Example 2-1

In accordance with the process of FIG. 1, a powder sample as shown in Table 2-1 were prepared by the following procedure.

First, Ba was selected as the first component, and Ta was selected as the second component. As the starting materials for these elements, there were furnished $BaCO_3$ and $Ta_2O_5$.

The starting materials were weighed so as to give a molar ratio of Ba and Ta as shown in Table 2-1. They were wet milled for 20 hours in a ball mill.

The mixture of starting materials was dried. Carbon powder having a mean particle size of 50 μm in an amount as shown in Table 2-1 was added to the mixture. The resulting mixture was dry milled and then molded into a cylindrical compact having a diameter of 15 mm and a a height of 10 mm. The compact was subjected to an oxynitride forming treatment wherein the compact was placed in a carbon container having an open top. A carbon lid was closed over the container, with a gap being left between the container and the lid. In a nitrogen gas stream, the compact was fired for 5 hours at a temperature as shown in Table 2-1. Some samples were fired without placing them in the container. Nitrogen gas was fed through the furnace so as to give a flow rate of 0.001 m/s per unit area in a cross section perpendicular to the direction of gas stream in a space in proximity to the compact. The firing atmosphere had an oxygen partial pressure of 20 Pa (0.0002 atm.). The fired compact was wet pulverized and dried, yielding a powder sample.

By x-ray analysis of the samples, products therein were examined. The results are shown in Table 2-1.

TABLE 2-1

Oxygen partial pressure: 20 Pa

| Sample | Molar ratio | | | Amount of carbon added | carbon | Firing temp. | Main |
|---|---|---|---|---|---|---|---|
| No. | Ba | Ta | X/Y | (mass %) | container | (° C.) | Product |
| 201 | 1.0 | 1.0 | 1.0 | 1 | used | 1200 | oxynitride + oxide |
| 202 | 1.0 | 1.0 | 1.0 | 2 | used | 1200 | oxynitride |
| 203 | 1.0 | 1.0 | 1.0 | 5 | used | 1200 | oxynitride |
| 204 | 1.0 | 1.0 | 1.0 | 10 | used | 1200 | oxynitride |
| 205 | 1.0 | 1.0 | 1.0 | 50 | used | 1200 | oxynitride |
| 206 | 0.7 | 1.0 | 0.7 | 5 | used | 1200 | oxynitride |
| 207 | 1.3 | 1.0 | 1.3 | 5 | used | 1200 | oxynitride |
| 208 | 1.6 | 1.0 | 1.6 | 5 | used | 1200 | oxynitride |
| 209 | 1.0 | 0.7 | 1.4 | 5 | used | 1200 | oxynitride |
| 210 | 1.0 | 1.3 | 0.77 | 5 | used | 1200 | oxynitride |
| 211 | 1.0 | 1.6 | 0.63 | 5 | used | 1200 | oxynitride |
| 212 | 1.0 | 1.0 | 1.0 | 5 | used | 1000 | oxynitride |
| 213 | 1.0 | 1.0 | 1.0 | 5 | used | 1400 | oxynitride |
| 214 | 1.0 | 1.0 | 1.0 | 5 | used | 1600 | oxynitride |
| 215 | 1.0 | 1.0 | 1.0 | 5 | not used | 1200 | oxynitride |

It is evident from Table 2-1 that the process of the invention ensures creation of oxynitride perovskite. It is noted that the samples with the composition shown in Table 2-1 melted when the firing temperature exceeded 1,700° C.

The samples in Table 2-1 were regarded as having created oxynitride when peaks attributable to oxynitride perovskite ($M^{I}M^{II}O_2N$ type crystals) were observed. The samples in Table 2-1 were regarded as having created oxide in addition to oxynitride when peaks attributable to oxides mainly of $M^{I}_5M^{II}_4O_{15}$ type crystals were also observed. Of the samples in Table 2-1, those samples fired at a temperature of 1,200° C. or higher also exhibited peaks attributable to the carbide (TaC).

In accordance with the process of JP-A 9-129177 by the same assignee of the present invention, a comparative electrode sample was fabricated by the following procedure. First, a mixture of the starting materials used in the preparation of sample No. 203 was molded under a pressure of 100 MPa and fired in air for 2 hours at 1,100° C. The fired body was subjected to wet milling, drying and granulation. The granules were compression molded into a compact. The compact filled with the granules was entirely embedded in carbon powder and fired at 1,600° C. for 2 hours in a nitrogen gas stream. Nitrogen gas was fed through the furnace so as to give a flow rate of 0.00005 m/s per unit area in a cross section perpendicular to the direction of gas stream in a space in proximity to the compact. The firing atmosphere had an oxygen partial pressure of 20 Pa (0.0002 atm.).

By x-ray analysis, the electrode sample was examined for products. It consisted of a single phase of compound oxide ($M^{I}_5M^{II}_4O_{15}$ type crystals) except for the carbide (TaC).

Example 2-2

Samples were fabricated as was sample No. 203 except that the oxygen partial pressure during firing was changed as shown in Table 2-2. Products in these samples were similarly examined. The results are also shown in Table 2-2. For comparison purposes, sample No. 203 is also shown in Table 2-2.

TABLE 2-2

Carbon container: used
Amount of carbon added: 5 mass %
Firing temperature: 1200° C.

| Sample No. | Molar ratio Ba | Ta | X/Y | Oxygen partial pressure (Pa) | Main product |
|---|---|---|---|---|---|
| 216 | 1.0 | 1.0 | 1.0 | $1 \times 10^4$ | oxide |
| 217 | 1.0 | 1.0 | 1.0 | $2 \times 10^3$ | oxynitride |
| 218 | 1.0 | 1.0 | 1.0 | $2 \times 10^2$ | oxynitride |
| 203 | 1.0 | 1.0 | 1.0 | 20 | oxynitride |
| 219 | 1.0 | 1.0 | 1.0 | 2 | oxynitride |

It is evident from Table 2-2 that the oxynitride perovskite can be decomposed unless the oxygen partial pressure is properly controlled. For the samples shown in Table 2-2, the formation of carbide (TaC) was also ascertained.

Example 2-3

Figure 10:
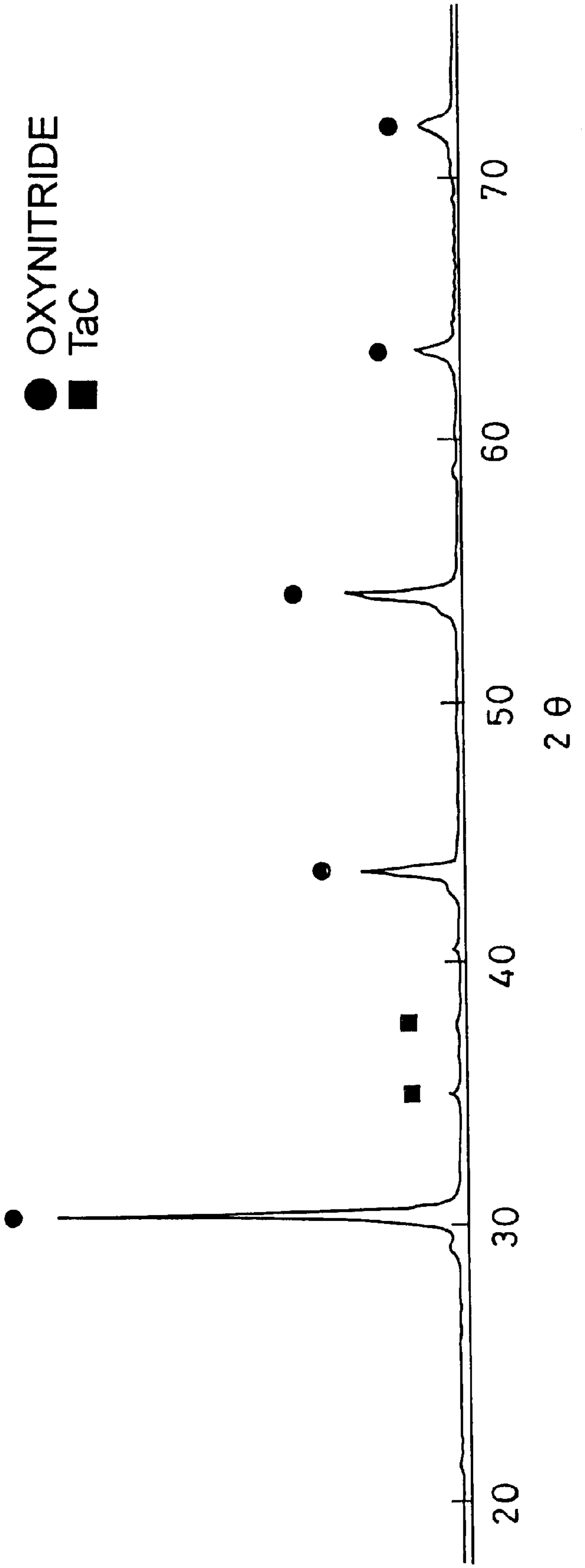
FIG. 10 is an x-ray diffraction pattern of a further electron-emitting material according to the invention (sample No. 229 in Example 2–3).

Samples were fabricated as was sample No. 203 except that the first component was combined with the second component as shown in Table 2-3. By x-ray diffractometry, products in these samples were examined. The results are also shown in Table 2-3. FIG. 10 shows an x-ray diffraction pattern of sample No. 229. For comparison purposes, sample No. 203 is also shown in Table 2-3.

TABLE 2-3

Carbon container: used
Amount of carbon added: 5 mass %
Firing temperature: 1200° C.
Oxygen partial pressure: 20 Pa

| Sample No. | Molar ratio Ba | Sr | Ca | Ta | Ti | Zr | Hf | Nb | X/Y | Main product |
|---|---|---|---|---|---|---|---|---|---|---|
| 203 | 1.0 | — | — | 1.0 | — | — | — | — | 1.0 | oxynitride |
| 220 | 0.5 | 0.5 | — | 1.0 | — | — | — | — | 1.0 | oxynitride |
| 221 | 0.2 | 0.8 | — | 1.0 | — | — | — | — | 1.0 | oxynitride |
| 222 | — | 1.0 | — | 1.0 | — | — | — | — | 1.0 | oxynitride |
| 223 | 0.5 | — | 0.5 | 1.0 | — | — | — | — | 1.0 | oxynitride |
| 224 | 0.2 | — | 0.8 | 1.0 | — | — | — | — | 1.0 | oxynitride |
| 225 | — | — | 1.0 | 1.0 | — | — | — | — | 1.0 | oxynitride |
| 226 | 0.4 | 0.3 | 0.3 | 1.0 | — | — | — | — | 1.0 | oxynitride |
| 227 | 1.0 | — | — | 0.5 | 0.5 | — | — | — | 1.0 | oxynitride |
| 228 | 1.0 | — | — | — | 1.0 | — | — | — | 1.0 | oxynitride |
| 229 | 1.0 | — | — | 0.5 | — | 0.5 | — | — | 1.0 | oxynitride |
| 230 | 1.0 | — | — | — | — | 1.0 | — | — | 1.0 | oxynitride |
| 231 | 1.0 | — | — | 0.5 | — | — | 0.5 | — | 1.0 | oxynitride |
| 232 | 1.0 | — | — | — | — | — | 1.0 | — | 1.0 | oxynitride |
| 233 | 1.0 | — | — | 0.5 | — | — | — | 0.5 | 1.0 | oxynitride |
| 234 | 1.0 | — | — | 0.2 | — | — | — | 0.8 | 1.0 | oxynitride |
| 235 | 1.0 | — | — | — | — | — | — | 1.0 | 1.0 | oxynitride |
| 236 | 1.0 | — | — | 0.8 | 0.1 | 0.1 | — | — | 1.0 | oxynitride |
| 237 | 1.0 | — | — | 0.8 | — | 0.1 | 0.1 | — | 1.0 | oxynitride |
| 238 | 1.0 | — | — | 0.8 | 0.1 | — | 0.1 | — | 1.0 | oxynitride |
| 239 | 1.0 | — | — | 0.6 | 0.1 | 0.1 | 0.1 | 0.1 | 1.0 | oxynitride |

It is evident from Table 2-3 that oxynitride perovskite forms even with combinations other than the combination of Ba and Ta. For the Ta-containing samples shown in Table 2-3, the formation of carbide (TaC) was also ascertained.

Of the compositions shown in Table 2-3, those samples having Zr or Hf added had a higher melting point and did not melt when fired at 2,000° C.

In Examples 2-1 through 2-3, all the samples in which oxynitride perovskite formed had a resistivity at room temperature in the range of $10^{-6}$ to $10^3$ Ωm.

Example 3-1

In accordance with the process shown in FIG. 4, electron-emitting material film samples as shown in Table 3-1 were manufactured by the following procedure.

First, Ba was selected as the first component, and Ta and Zr were selected as the second component. As the starting materials for these elements, there were furnished $BaCO_3$, $Ta_2O_5$ and $ZrO_2$.

The starting materials were weighed so as to give a molar ratio of Ba:Ta:Zr=1:0.8:0.2. The starting materials were wet milled with water and polyvinyl alcohol for 20 hours in a ball mill, yielding a slurry.

By a printing technique, the slurry was applied onto the surface of a plate substrate to form a coat. The material of the substrate and the thickness of the coat are shown in Table 3-1. Note that SiAlON in Table 3-1 indicates a sintered oxynitride body containing Al and Si as metal element components.

Next, the coat was subjected to an oxynitride forming treatment. Namely, the substrate having the coat formed thereon was placed in a carbon container having an open top. A carbon lid was closed over the container, with a gap being left between the container and the lid. In a nitrogen gas stream, the coated substrate was fired at 1,400° C. for 5 hours, obtaining an electron-emitting material film sample. Nitrogen gas was fed through the furnace so as to give a flow rate of 0.001 m/s per unit area in a cross section perpendicular to the direction of gas stream in a space in proximity to the coat. The firing atmosphere had an oxygen partial pressure as shown in Table 3-1.

By x-ray diffractometry, the film samples shown in Table 3-1 were examined for products. For all the samples, peaks attributable to the oxynitride perovskite ($M^IM^{II}O_2N$ type crystal) and peaks attributable to the carbide (TaC) were observed. Relative evaluation of the peak intensity of the respective samples is also shown in Table 3-1.

TABLE 3-1

| Sample No. | Substrate material | Coat thickness (μm) | Oxygen partial pressure (Pa) | Oxinitride peak |
|---|---|---|---|---|
| 301 | W | 300 | 10 | very intense |
| 302 | W | 100 | 10 | very intense |
| 303 | W | 20 | 10 | very intense |
| 304 | W | 5 | 10 | intense |
| 305 | W | 100 | $1 \times 10^2$ | intense |
| 306 | W | 100 | $4 \times 10^2$ | very weak |
| 307 | Mo | 100 | 10 | very intense |
| 308 | Ta | 100 | 10 | very intense |
| 309 | Ni | 100 | 10 | very intense |
| 310 | $ZrO_2$ | 100 | 10 | intense |
| 311 | $Al_2O_3$ | 100 | 10 | intense |
| 312 | SIALON | 100 | 10 | intense |

It is evident from Table 3-1 that the process of the invention creates oxynitride perovskite.

In accordance with the process of JP-A 9-129177 by the same assignee of the present invention, a comparative electrode sample was fabricated by the following procedure.

First, a mixture of the starting materials used in the preparation of sample No. 304 was molded under a pressure of 100 MPa and fired in air for 2 hours at 1,100° C. The fired body was subjected to wet milling, drying and granulation. The granules were compression molded into a compact. The compact was filled with the granules, entirely embedded in carbon powder and fired at 1,600° C. for 2 hours in a nitrogen gas stream. Nitrogen gas was fed through the furnace so as to give a flow rate of 0.00005 m/s per unit area in a cross section perpendicular to the direction of gas stream in a space in proximity to the compact. The firing atmosphere had an oxygen partial pressure of 20 Pa (0.0002 atm.).

By x-ray analysis, the electrode sample was examined for products. It consisted of a single phase of compound oxide ($M^{I}_5M^{II}_4O_{15}$ type crystals) except for the carbide (TaC).

In accordance with the process shown in FIG. 5, electron-emitting material film samples as shown in Table 3-2 were manufactured by the following procedure.

The starting materials used in Example 3-1 were weighed and mixed as in Example 3-1. Carbon powder having a mean particle size of 0.01 μm was admixed therewith. The amount of carbon was 5 mass % based on the starting materials.

The mixture was molded into a cylindrical compact having a diameter of 15 mm and a height of 10 mm. The compact was subjected to an oxynitride forming treatment. In this treatment, the compact was fired under the same conditions as in the firing of a coat in Example 3-1 except that the compact was placed in an open top carbonaceous container and the firing atmosphere had an oxygen partial pressure as shown in Table 3-2.

The fired compact was pulverized and admixed with a binder (acrylic resin) and a solvent (α-terpineol) to form a slurry, which was printed onto the surface of a plate substrate to form a coat. The material of the substrate and the thickness of the coat are shown in Table 3-2. The viscosity of the slurry was selected in the range of 7,000 to 100,000 mpa-s to an appropriate value for adjusting the thickness of the coat.

The coated substrate was heat treated in a nitrogen gas stream at 400° C. for 2 hours, yielding an electron-emitting material film sample. The film samples were analyzed by x-ray diffractometry as in Example 3-1. For all the samples, peaks attributable to the oxynitride perovskite ($M^{I}M^{II}O_2N$ type crystal) and peaks attributable to the carbide (TaC) were observed. Relative evaluation of the peak intensity of the respective samples is also shown in Table 3-2.

TABLE 3-2

| Sample No. | Substrate material | Coat thickness (μm) | Oxygen partial pressure (Pa) | oxynitride peak |
|---|---|---|---|---|
| 313 | W | 30 | 10 | very intense |
| 314 | W | 20 | 10 | very intense |
| 315 | W | 10 | 10 | very intense |
| 316 | W | 5 | 10 | very intense |
| 317 | Mo | 10 | 10 | very intense |
| 318 | Ta | 10 | 10 | very intense |
| 319 | Ni | 10 | 10 | very intense |
| 320 | $ZrO_2$ | 10 | 10 | very intense |
| 321 | $Al_2O_3$ | 10 | 10 | very intense |
| 322 | SIALON | 10 | 10 | very intense |

A comparison of Table 3-1 with Table 3-2 reveals that in the electron-emitting material films produced by the process of FIG. 5, the quantity of oxynitride perovskite formed does not depend on the thickness of the coat. In the process of creating an oxynitride in the coat, the content of the electron-emitting material near the surface of the electron-emitting material film is slightly low because TaC forms near that surface.

Example 3-3

The same steps as in Example 3-2 were taken until the preparation of a slurry. Slurries having different viscosities were prepared for adjusting the thickness of coats. A metal wire was used as the substrate. By dipping the metal wire in the slurry, a coat was formed on the wire. The thickness of the coat was controlled by adjusting the viscosity of the slurry and the number of dips. The material of the substrate and the thickness of the coat are shown in Table 3-3. Heat treatment was then effected as in Example 3-2, obtaining electron-emitting material film samples. The film samples were analyzed by x-ray diffractometry as in Example 3-1. For all the samples, peaks attributable to the oxynitride perovskite ($M^{I}M^{II}O_2N$ type crystal) and peaks attributable to the carbide (TaC) were observed. Relative evaluation of the peak intensity of the respective samples is also shown in Table 3-3.

TABLE 3-3

| Sample No. | Substrate material | Coat thickness (μm) | Oxygen partial pressure (Pa) | Oxyntride peak |
|---|---|---|---|---|
| 323 | W | 1000 | 10 | very intense |
| 324 | W | 300 | 10 | very intense |
| 325 | W | 30 | 10 | very intense |
| 326 | W | 5 | 10 | very intense |
| 327 | Mo | 100 | 10 | very intense |
| 328 | Ta | 100 | 10 | very intense |
| 329 | Ni | 100 | 10 | very intense |
| 330 | $ZrO_2$ | 100 | 10 | very intense |
| 331 | $Al_2O_3$ | 100 | 10 | very intense |
| 332 | SIALON | 100 | 10 | very intense |

It is evident from Table 3-3 that an electron-emitting material film is formed on the surface of a metal wire.

Additionally, a slurry was prepared as in Example 3-3 except that its viscosity was 10 mPa-s. The slurry was sprayed over a metal plate in a nitrogen atmosphere. At the same time as spraying, the coating was heated by means of a burner, forming an electron-emitting material film.

In Examples 3-1 through 3-3, all the electron-emitting material film samples had a resistivity at room temperature in the range of $10^{-6}$ to $10^3$ Ωm.

Although electron-emitting materials were formed by the processes shown in FIGS. 1, 4 and 5 in the foregoing examples, electron-emitting materials having substantially equivalent characteristics could be produced by the other processes described herein wherein the respective conditions in the oxynitride forming step were equivalent.

Benefits of the Invention

There has been described an electron-emitting material having improved electron emission characteristics, restrained evaporation at high temperatures, and minimized consumption by ion sputtering, on account of the oxynitride included therein. When the electron-emitting material is applied to electrodes in discharge lamps, the resulting discharge lamps experience minimized blackening of their bulb wall and have a long lifetime. Since the electron-emitting material containing oxynitride can be produced without using ammonia gas, the invention eliminates a need for a production system specially designed from ammonia gas considerations, enabling mass-scale production and cost reduction.

Japanese Patent Application Nos. 11-067614, 11-067615, and 11-076941 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An electron-emitting material comprising crystals of a non-dielectric oxynitride perovskite having the following formula: $M^I M^{II}(O,N)_3$, wherein $M^I$ is selected from the group consisting of barium, strontium, calcium and mixtures thereof, and $M^{II}$ is selected from the group consisting of tantalum, zirconium, niobium, titanium, hafnium and mixtures thereof.

2. The electron-emitting material of claim 1 wherein the oxynitride perovskite has the formula $M^I M^{II} O_2 N$.

3. The electron-emitting material of claim 1 which satisfies the relationship:

$0.8 \leqq X/Y \leqq 1.5$ wherein X and Y are molar ratios of $M^I$ and $M^{II}$ to the total of $M^I$ and $M^{II}$, respectively.

4. The electron-emitting material of claim 1 wherein $M^{II}$ is partially present in the form of a carbide or nitride or both.

5. The electron-emitting material of claim 1 which further contains as an additional metal element component at least one element M which is selected from the group consisting of Mg, Sc, Y, La, V, Cr, Mo, W, Fe, Ni, and Al.

6. The electron-emitting material of claim 5 which contains the element M in an amount of more than 0 mass % to 10 mass % calculated as oxide.

7. The electron-emitting material of claim 1 which further contains at least one oxide selected from the group consisting of $M^I_4 M^{II}_2 O_9$, $M^I M^{II}_2 O_6$, $M^I M^{II}_2 O_3$, $M^I_5 M^{II}_4 O_{15}$, $M^I_7 M^{II}_6 O_{22}$, and $M^I_6 M^{II} M^{II}_4 O_{18}$ crystals wherein $M^I$ and $M^{II}$ are as defined above.

8. The electron-emitting material of claim 1 which has a resistivity of $10^{-6}$ to $10^3$ Ωm at room temperature.

9. The electron-emitting material of claim 1 wherein $M^{II}$ contains up to 98 at % of tantalum.

10. The electron-emitting material of claim 1 which has been prepared by a process comprising disposing a mixture of raw materials containing the metal element components in close proximity to carbon, passing nitrogen gas thereover at a flow rate of 0.0001 to 5 m/s per unit area in a cross section perpendicular to the direction of nitrogen stream in a space proximate to the mixture, and firing the mixture under these conditions.

11. A process for preparing an electron-emitting material as set forth in claim 1, comprising the oxynitride forming step of:

firing a metal element component-containing material disposed in proximity to carbon in a nitrogen gas-containing atmosphere to create oxynitride perovskite, yielding the electron-emitting material.

12. The process of claim 11 wherein the nitrogen gas-containing atmosphere has an oxygen partial pressure of 0 to $5.0 \times 10^3$ Pa.

13. The process of claim 11 wherein a nitrogen gas stream is used as the nitrogen gas-containing atmosphere and fed at a flow rate of 0.0001 to 5 m/s per unit area in a cross section perpendicular to the direction of nitrogen stream in a space proximate to the material to be fired.

14. The process of claim 11 further comprising the step of admixing carbon with the metal element component-containing material so that the metal element component-containing material is disposed in proximity to carbon.

15. The process of claim 11 wherein a firing furnace which is at least partially composed of carbon is used in the oxynitride forming step so that the metal element component-containing material is disposed in proximity to carbon.

16. The process of claim 11 wherein the metal element component-containing material is received in a container which is at least partially composed of carbon so that the metal element component-containing material is disposed in proximity to carbon.

17. The process of claim 11 wherein the metal element component-containing material contains a compound oxide.

18. The process of claim 11 further comprising the step of molding the metal element component-containing material into a compact, which is fired in the oxynitride forming step to provide a sintered body of electron-emitting material.

19. The process of claim 11 further comprising the step of applying the metal element component-containing material to form a coat, which is fired in the oxynitride forming step to provide a film of electron-emitting material.

20. The process of claim 11 further comprising the step of pulverizing the electron-emitting material resulting from the oxynitride forming step, yielding a powder of electron-emitting material.

21. The process of claim 20 further comprising the steps of:

molding the electron-emitting material powder into a compact, and firing the compact in a nitrogen gas-containing atmosphere to form a sintered body of electron-emitting material while restraining decomposition of the oxynitride perovskite.

22. The process of claim 20 further comprising the steps of:

preparing a slurry of the electron-emitting material powder, applying the slurry to form a coat, and heat treating the coat to form a film of the electron-emitting material.

* * * * *

UNITED STATES PATENT AND TRADEMARK OFFICE

CERTIFICATE OF CORRECTION

PATENT NO. : 6,383,416 B1
DATED : May 7, 2002
INVENTOR(S) : Munemitsu Hamada et al.

It is certified that error appears in the above-identified patent and that said Letters Patent is hereby corrected as shown below:

Column 27,
Line 35, "$M^IM^{II}{}_2O_3$," should read -- $M^IM^{II}O_3$, --.

Signed and Sealed this

Eighteenth Day of February, 2003

JAMES E. ROGAN
*Director of the United States Patent and Trademark Office*